(12) United States Patent  
Maeda

(10) Patent No.: US 11,310,396 B2  
(45) Date of Patent: Apr. 19, 2022

(54) COLOR MANAGEMENT SYSTEM, PRINTING APPARATUS AND METHOD OF CONTROLLING THE PRINTING APPARATUS, AND STORAGE MEDIUM

(71) Applicant: CANON KABUSHIKI KAISHA, Tokyo (JP)

(72) Inventor: Yuuki Maeda, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/277,048

(22) Filed: Feb. 15, 2019

(65) Prior Publication Data

US 2019/0260910 A1    Aug. 22, 2019

(30) Foreign Application Priority Data

Feb. 21, 2018    (JP) .............................. JP2018-029052

(51) Int. Cl.  
*H04N 1/60*    (2006.01)

(52) U.S. Cl.  
CPC ........... *H04N 1/6033* (2013.01); *H04N 1/603* (2013.01); *H04N 1/6008* (2013.01);  
(Continued)

(58) Field of Classification Search  
CPC combination set(s) only.  
See application file for complete search history.

(56) References Cited

U.S. PATENT DOCUMENTS 6,147,698 A * 11/2000 Zable ................... H04N 1/4078  
                                                347/240  
8,773,715 B2    7/2014 Katayama et al.  
(Continued)

FOREIGN PATENT DOCUMENTS

JP      H07-107313      *   4/1995  
JP      2002-290756 A      10/2002  
(Continued)

OTHER PUBLICATIONS

Best Remoteproof, Mar. 13, 2006, https://web.archive.org/web/20060701000000*/https://www.efi.com/documents/products/prepress/proofing/remoteproof/pdf/remoteproofbestbrochureproductv1.pdf (Year: 2006).*

*Primary Examiner* — Barbara D Reinier  
(74) *Attorney, Agent, or Firm* — Venable LLP

(57) ABSTRACT

A color management system includes an external apparatus and a printing apparatus. The external apparatus includes a first controller including a first processor and a first memory to send a color verification setting, including at least sheet information, that is set for a color verification operation, and a color verification execution condition that is set for the color verification operation to the printing apparatus. The printing apparatus includes a second controller including a second processor and a second memory to receive the color verification setting and the color verification execution condition from the external apparatus, print a chart image on a sheet corresponding to the sheet information included in the color verification setting in accordance with having satisfied the color verification execution condition, measure the chart image printed on the sheet, and transmit data obtained by a measurement of the chart image to the external apparatus.

11 Claims, 23 Drawing Sheets

(52) U.S. Cl.
CPC ......... *H04N 1/6044* (2013.01); *H04N 1/6052* (2013.01); *H04N 1/6091* (2013.01)

(56) References Cited

U.S. PATENT DOCUMENTS

| | | | |
|---|---|---|---|
| 8,861,024 B2 | 10/2014 | Teraue | |
| 10,148,828 B2 | 12/2018 | Sakatani | |
| 2004/0212816 A1* | 10/2004 | Tanabe | H04N 1/6033 358/1.9 |
| 2006/0126106 A1* | 6/2006 | Harrington | G06F 3/1207 358/1.15 |
| 2010/0079524 A1* | 4/2010 | Saita | H04N 1/6033 347/14 |
| 2011/0255109 A1* | 10/2011 | Kanamori | G03G 15/502 358/1.12 |
| 2012/0188596 A1* | 7/2012 | Niles | G06F 3/1229 358/1.15 |
| 2013/0011153 A1 | 1/2013 | Toriyabe | |
| 2017/0208184 A1 | 7/2017 | Toriyabe | |
| 2019/0095147 A1* | 3/2019 | Yano | G06F 3/1208 |

FOREIGN PATENT DOCUMENTS

| | | |
|---|---|---|
| JP | 2003-118085 A | 4/2003 |
| JP | 2005-229475 A | 8/2005 |
| JP | 2008-228017 A | 9/2008 |
| JP | 2011-237358 A | 11/2011 |
| JP | 2012-070298 A | 4/2012 |
| JP | 2012-217054 A | 11/2012 |
| JP | 2013-186828 A | 9/2013 |
| JP | 2018-026740 A | 2/2018 |

\* cited by examiner

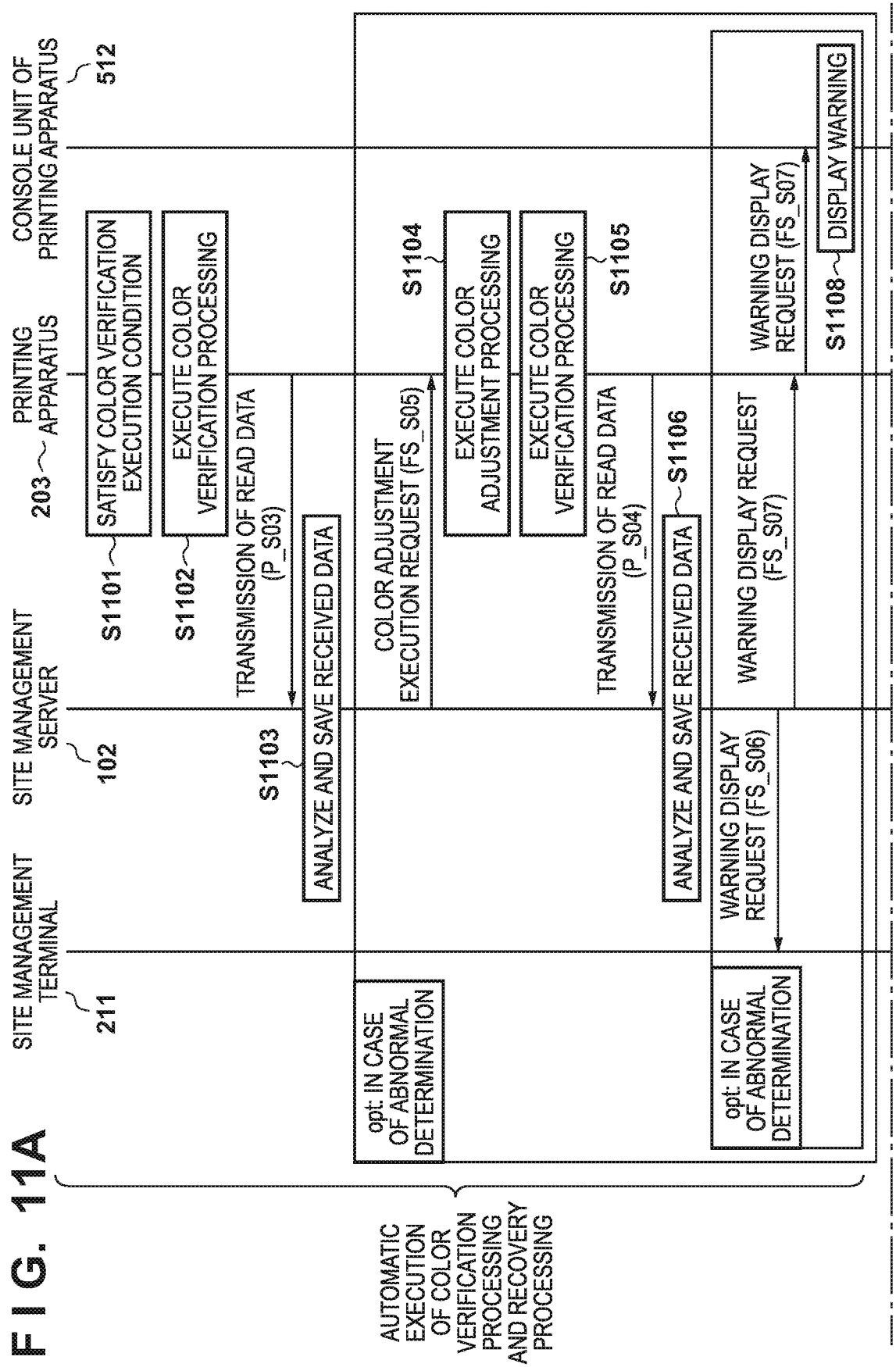

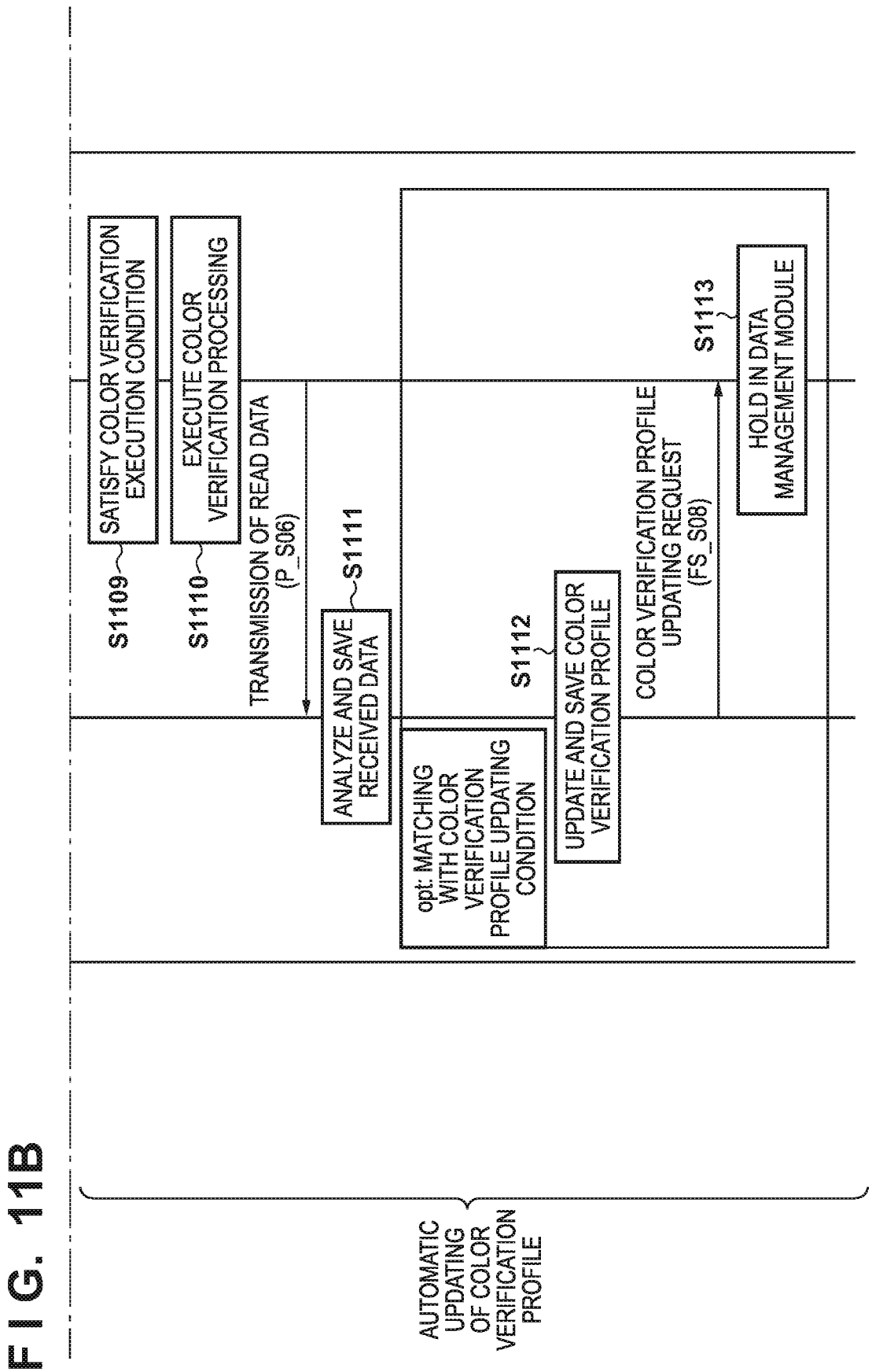

FIG. 12A

1200 — COLOR VERIFICATION PROFILE

| Field | |
|---|---|
| ID | 1201 |
| NAME | 1202 |
| VALID | 1203 |
| COLOR VERIFICATION SETTING | 1204 |
| COLOR VERIFICATION EXECUTION CONDITION | 1205 |
| COLOR ADJUSTMENT SETTING | 1206 |
| MEASURED RESULT | 1207 |

1210 — COLOR VERIFICATION SETTING

| Field | |
|---|---|
| ID | 1211 |
| NAME | 1212 |
| PATCH CHART | 1213 |
| REFERENCE | 1214 |
| DETERMINATION CRITERION | 1215 |
| SHEET | 1216 |
| JOB PROPERTY | 1217 |

1220 — COLOR VERIFICATION EXECUTION CONDITION

| Field | |
|---|---|
| ID | 1221 |
| NAME | 1222 |
| DATE | 1223 |
| PRINTED SHEET INTERVAL | 1224 |

1230 — COLOR ADJUSTMENT SETTING

| Field | |
|---|---|
| ID | 1231 |
| NAME | 1232 |
| ADJUSTMENT | 1233 |

Figure 12C:
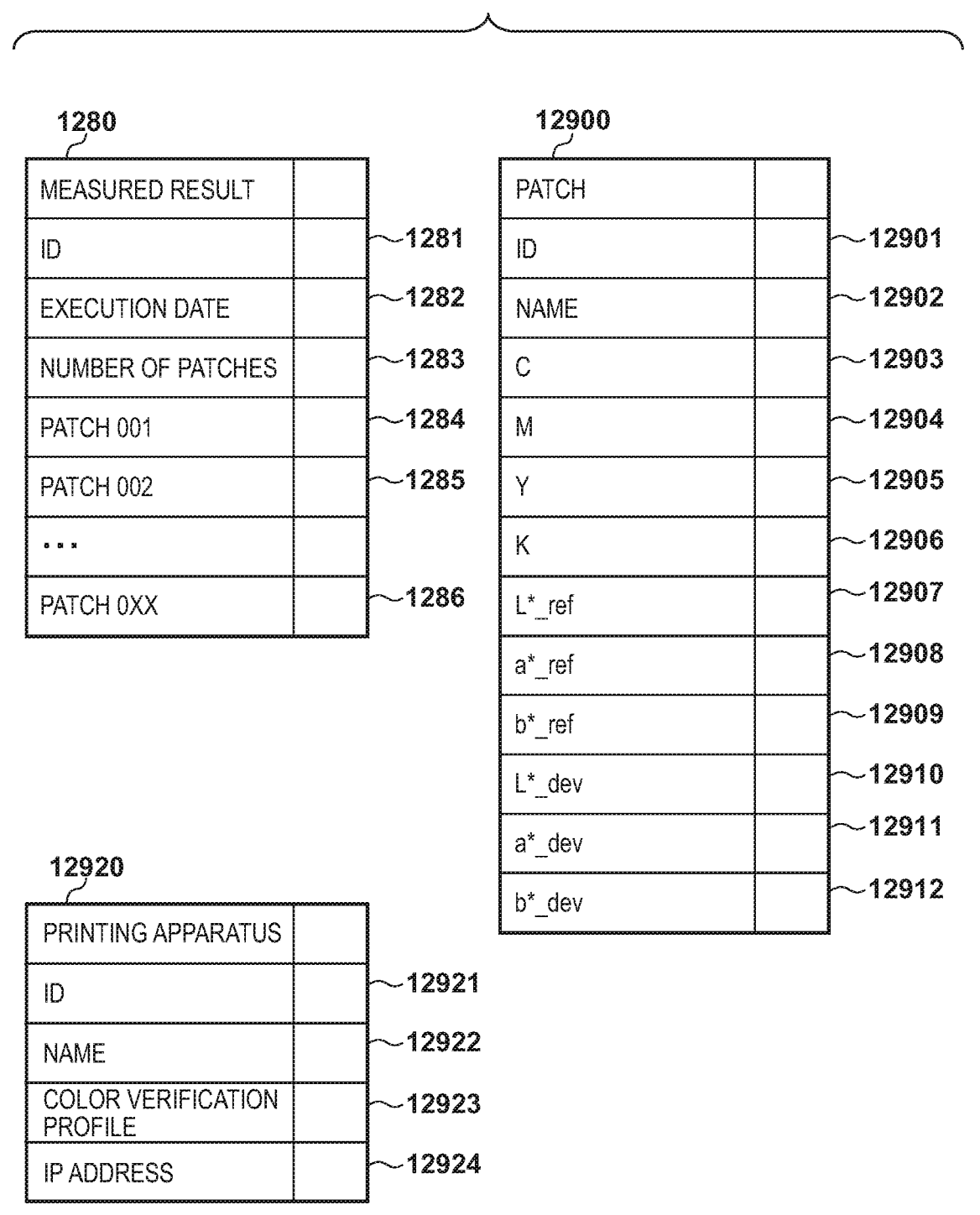

| MEASURED RESULT | |
|---|---|
| ID | ~1281 |
| EXECUTION DATE | ~1282 |
| NUMBER OF PATCHES | ~1283 |
| PATCH 001 | ~1284 |
| PATCH 002 | ~1285 |
| ... | |
| PATCH 0XX | ~1286 |

12900

| PATCH | |
|---|---|
| ID | ~12901 |
| NAME | ~12902 |
| C | ~12903 |
| M | ~12904 |
| Y | ~12905 |
| K | ~12906 |
| L*_ref | ~12907 |
| a*_ref | ~12908 |
| b*_ref | ~12909 |
| L*_dev | ~12910 |
| a*_dev | ~12911 |
| b*_dev | ~12912 |

12920

| PRINTING APPARATUS | |
|---|---|
| ID | ~12921 |
| NAME | ~12922 |
| COLOR VERIFICATION PROFILE | ~12923 |
| IP ADDRESS | ~12924 |

FIG. 17

COLOR MANAGEMENT, ENVIRONMENT SETTING

REFERENCE ~1701      1702                1705      1707
|  NAME  |
|--------|
| Ref001 |
| Ref002 |

- EDIT
- DELETE
- CREATE

1708

| NUMBER OF PATCHES | 52 | ~1703 |

1704

| # | CMYK | L* | a* | b* |
|---|------|------|------|-------|
| 001 | 0, 0, 0, 0 | 90.00 | 1.05 | -1.30 |
| 002 | 10, 0, 0, 0 | XX | XX | XX |
| 003 | 20, 0, 0, 0 | XX | XX | XX |

1706

SAVE

FIG. 18

COLOR MANAGEMENT, ENVIRONMENT SETTING

DETERMINATION CRITERION ~1801   1802       1804      1805

| NAME |
|------|
| ToleranceSet001 |
| ToleranceSet002 |

- EDIT
- DELETE
- CREATE

1806

1803

| ITEM | THRESHOLD |
|------|-----------|
| NAME | ToleranceSet001 |
| AVERAGE dE | 3.0 |
| MAXIMUM dE | 5.0 |
| Paper White | 1.0 |

1807

SAVE

FIG. 23

| STATE VERIFICATION/STOP | | |
|---|---|---|
| JOB | SHEET | TONER/OTHERS |

| DATE | JOB NAME | USER NAME | STATE | WAIT TIME |
|---|---|---|---|---|
| | | | | |
| | | | | |

| INTERRUPT PRINT | DETAILED INFORMATION | STOP | VERIFICATION PRINT |
|---|---|---|---|

PLEASE SUPPLY A3 DOUBLE-SIDED COATED SHEETS (90 gsm)

PLEASE SUPPLY A3 DOUBLE-SIDED COATED SHEETS (250 gsm)

CLOSE

☐ PLEASE SUPPLY A3 DOUBLE-SIDED COATED SHEETS (250 gsm)

FIG. 24A

| COLOR MANAGEMENT SYSTEM, WARNING MESSAGE |
|---|

COLOR VERIFICATION SETTING IS CHANGED

VERIFY CONTENTS OF SETTING CHANGE   [VERIFY]

FIG. 24B

| COLOR MANAGEMENT SYSTEM, WARNING MESSAGE |
|---|

CHANGED PORTION IS DISPLAYED IN BOLD

TO VERIFY CONTENTS OF CHANGED CONTENTS, PLEASE SELECT PROFILE TO BE VERIFIED AND PRESS DETAIL BUTTON

| PROFILE | COLOR VERIFICATION SHEET TYPE | SHEET SIZE | COLOR VERIFICATION EXECUTION TIMING | RECOVERY PROCESSING |
|---|---|---|---|---|
| #001 | DOUBLE-SIDED COATED SHEETS (100 gsm) | A4 | Verify001 | Adjust009 |
| #002 | PLAIN PAPER (86 gsm) | A3 | Verify001 | Adjust001 |

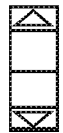

[DETAIL]   [CANCEL]

COLOR MANAGEMENT SYSTEM, PRINTING APPARATUS AND METHOD OF CONTROLLING THE PRINTING APPARATUS, AND STORAGE MEDIUM

BACKGROUND OF THE INVENTION

Field of the Invention

The present invention relates to a color management system, a printing apparatus and a method of controlling the printing apparatus, and a storage medium.

Description of the Related Art

In recent years, various printing apparatuses have been sold for the commercial printing market. Since printed products printed and output by these printing apparatuses are merchandise of customers, the requirement for the accuracy of colors of images printed on the printed products is high. However, the colors of an image printed by a printing apparatus vary due to various factors. For example, the colors vary depending on the degradation degrees of the parts of the printing apparatus, the environment (temperature and humidity) in which the printing apparatus is installed, consumables such as toner and sheets used when the printing apparatus prints, and the like.

On the site of commercial printing, a person generally called a color expert is deployed. The person performs a color management operation to keep the colors of an image printed by a printing apparatus to desired colors. The color management operation includes a plurality of steps. One of the steps is a color verification operation of verifying the colors of an image printed by a printing apparatus of a color management target. In the color verification operation, a predetermined chart is printed using the printing apparatus of the color management target, and the chart is measured by a colorimetric apparatus. The measured value is compared with a target value (reference) defined in advance. It is determined whether or not the colors of the image printed by the printing apparatus of the color management target satisfy a predetermined quality standard of color (whether the color difference between the measured value and the target value is equal to or less than a threshold). If the predetermined quality standard of color is satisfied (the color difference is equal to or less than the threshold), the printing apparatus is approved as a printing apparatus capable of executing subsequent printing steps.

On the other hand, if the predetermined quality standard of color is not satisfied (the color difference is more than the threshold), the color expert performs a color adjustment operation of the printing apparatus. The color adjustment operation is an execution operation of various kinds of calibration functions represented by gray scale correction. After the color adjustment operation, the color expert performs the color verification operation again and verifies whether or not the colors of an image printed by the printing apparatus reach the predetermined quality standard of color. If the printing apparatus cannot reach the predetermined quality standard of color even after execution of the color adjustment operation, the color expert performs color adjustment operations of higher difficulty such as color profile re-creation and fine adjustment of image forming conditions. Furthermore, the color expert sometimes accumulates the data of the result of the color verification operation and uses the data for an application purpose such as to understand the characteristics of the printing apparatus or verification of a temporal change.

The operation burden on the color expert is very large because he/she sometimes executes the above-described color management operation for a plurality of printing apparatuses installed in the print site under the management of the color expert. For this reason, in many cases, roles are allocated concerning the above-described color management operation such that the color expert only sets operating information necessary for executing the color management operation, and an operator performs an actual operation for a printing apparatus. In this case, the color expert performs the color management operation by setting operating information for color management of printing apparatuses installed in each print site from a remote site such as an office and sending operation instructions or a manual to each operator to instruct an operation that should be performed by the operator on the site. Examples of the operating information here are the tolerance of the color difference between a target value and a measured value, color adjustment to be performed outside the tolerance, and a print setting when printing a chart image. These pieces of operating information are set depending on the product model, application purpose, image output characteristic, and the like of each printing apparatus. Hence, when simultaneously managing a plurality of printing apparatuses, the color expert needs to set operating information according to each apparatus and reliably instruct the operating information to the operator in accordance with each printing apparatus.

The color expert is thus required to have high proficiency at understanding the information of a plurality of printing apparatuses and apply operating information. It is also necessary to correctly notify the operator of the setting of operating information by the color expert. Hence, in the color management operation, a color management system capable of reducing the burden on the color expert with high proficiency and reliably notifying an operator with low proficiency of the operation contents is required. That is, it is necessary to execute the color management operation by an easy operation independently of the proficiency of a user and easily perform the color management operation even for a plurality of printing apparatuses.

For example, Japanese Patent Laid-Open No. 2002-290756 describes that measured data of each printing apparatus is obtained, and a profile configured to match the color reproduction state of a printing apparatus that actually performs output with that of a target printing apparatus is generated.

Japanese Patent Laid-Open No. 2002-290756 described above proposes a system capable of easily performing color matching between printing apparatuses in printing apparatuses connected via a network and a color matching apparatus and easily performing color management even in a terminal connected via the network. This can reduce the burden of part of the color management operation on the color expert.

However, there is no proposal of a method of matching the color management operation expected by the color expert who manages colors on the terminal side with the color management operation actually performed by the operator on the printing apparatus side in a case in which the terminal and the printing apparatus are located in remote sites and connected via a network. For example, to do color matching as an example of color management, the conditions (a sheet to be used, print settings of a chart, a colorimetric measurement device, and the like) of charts measured by the printing apparatuses need to match. In the above-described conventional technique, however, the conditions (what kind of sheet should be used to output a chart, what kind of print settings should be used to output a chart, and the like) to obtain measured data are assumed to be reliably notified. For this reason, even if colorimetric measurement is performed by the printing apparatuses under conditions different from each other, the color expert can hardly notice.

SUMMARY OF THE INVENTION

An aspect of the present invention is to eliminate the above-mentioned problem with conventional technology.

A feature of the present invention is to provide a technique of reliably notifying an operator who operates a printing apparatus of an instruction from an information processing apparatus for performing color management in a color management system that manages the colors of an image printed by the printing apparatus.

According to a first aspect of the present invention, there is provided a color management system that includes an information processing apparatus for managing each of a plurality of print sites each including at least one printing apparatus and manages colors of an image printed by the printing apparatus in each print site, wherein the information processing apparatus comprises: a first memory that stores a set of instructions; and at least one first processor that executes the instruction to; upon receiving a change of a setting of a color management setting, notify the printing apparatus of the change, the printing apparatus comprises: a printer engine; a color sensor that measures a printed image; a second memory that stores a set of instructions; and at least one second processor that executes the instruction to: print a chart image by the printer engine in accordance with the color management setting; measure, by the color sensor, the image printed by the printer engine; obtain a difference between a result of colorimetric measurement by the color sensor and a target value in accordance with the color management setting, determine whether or not the result of the colorimetric measurement of the chart image printed by the printer engine satisfies a preset determination criterion, and instruct to execute color adjustment processing in a case in which the determination criterion is not satisfied; determine whether or not the change of the setting of the color management setting includes a change concerning a first setting; upon determining that the change of the setting of the color management setting includes the change concerning the first setting, determine whether or not printing by the change of the setting is possible; and upon determining that the printing is not possible, make a warning.

According to a second aspect of the present invention, there is provided a printing apparatus capable of printing a chart image in accordance with a color management setting and executing color adjustment processing based on a result obtained by measuring the chart image, the printing apparatus comprising: a memory that stores a set of instructions; and at least one processor that executes the instruction to: determine whether or not a change of a setting of the color management setting includes a change concerning a first setting; upon determining that the change of the setting of the color management setting includes the change concerning the first setting, determine whether or not printing by the change of the setting is possible; and upon determining that the printing is not possible, make a warning.

According to a third aspect of the present invention, there is provided a method of controlling a printing apparatus capable of printing a chart image in accordance with a color management setting and executing color adjustment processing based on a result obtained by measuring the chart image, comprising: determining whether or not a change of a setting of the color management setting includes a change concerning a first setting; upon determining that the change of the setting of the color management setting includes the change concerning the first setting, determining whether or not printing by the change of the setting is possible; and upon determining that the printing is not possible, making a warning.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 11A and 11B are sequence charts for explaining color verification processing provided by the color management system according to the embodiment and an example of a sequence automatically executed by the system in accordance with a color verification result;

FIG. 12A depicts a view for explaining databases provided in the color management system according to the embodiment;

FIG. 12C depicts a view for explaining databases provided in the color management system according to the embodiment;

FIG. 17 depicts a view showing an example of a reference editing screen in the environment setting of the site management application according to the embodiment;

FIG. 18 depicts a view showing an example of a determination criterion editing screen in the environment setting of the site management application according to the embodiment;

FIG. 23 depicts a view showing an example of a screen displayed on the console unit of the printing apparatus in step S2205 of FIG. 22; and FIGS. 24A and 24B depict views showing an example of another screen displayed on the console unit of the printing apparatus in step S2205 of FIG. 22.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
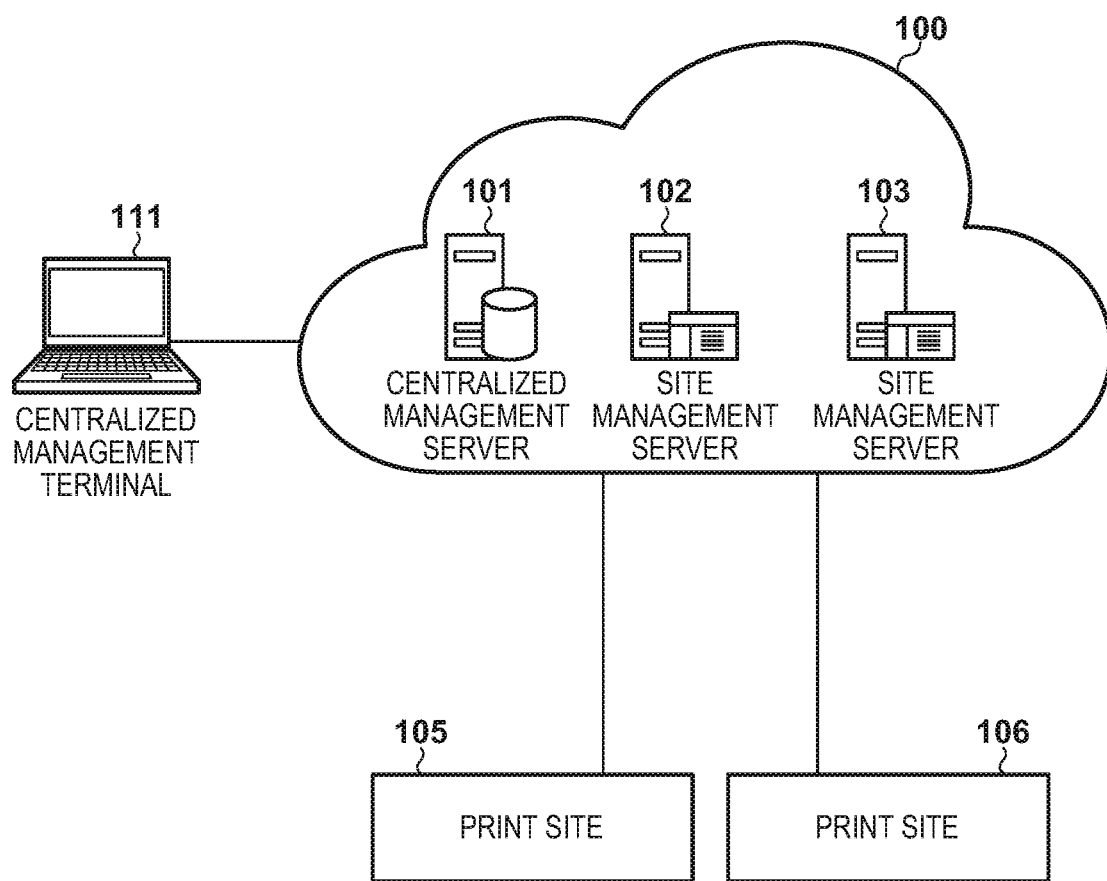
FIG. 1 is a schematic diagram for explaining the overall arrangement of a printing system according to the embodiment of the present invention.

FIG. 1 is a schematic diagram for explaining the overall arrangement of a printing system according to the embodiment of the present invention. Here, a print site 105 and a print site 106 exist under the management of a centralized management site that manages all sites existing at different locations. In the embodiment, an example in which at least one printing apparatus operates in each print site is used. However, the present invention is not limited to this. A system arrangement including more print sites under the management of the centralized management site may be used.

Figure 2:
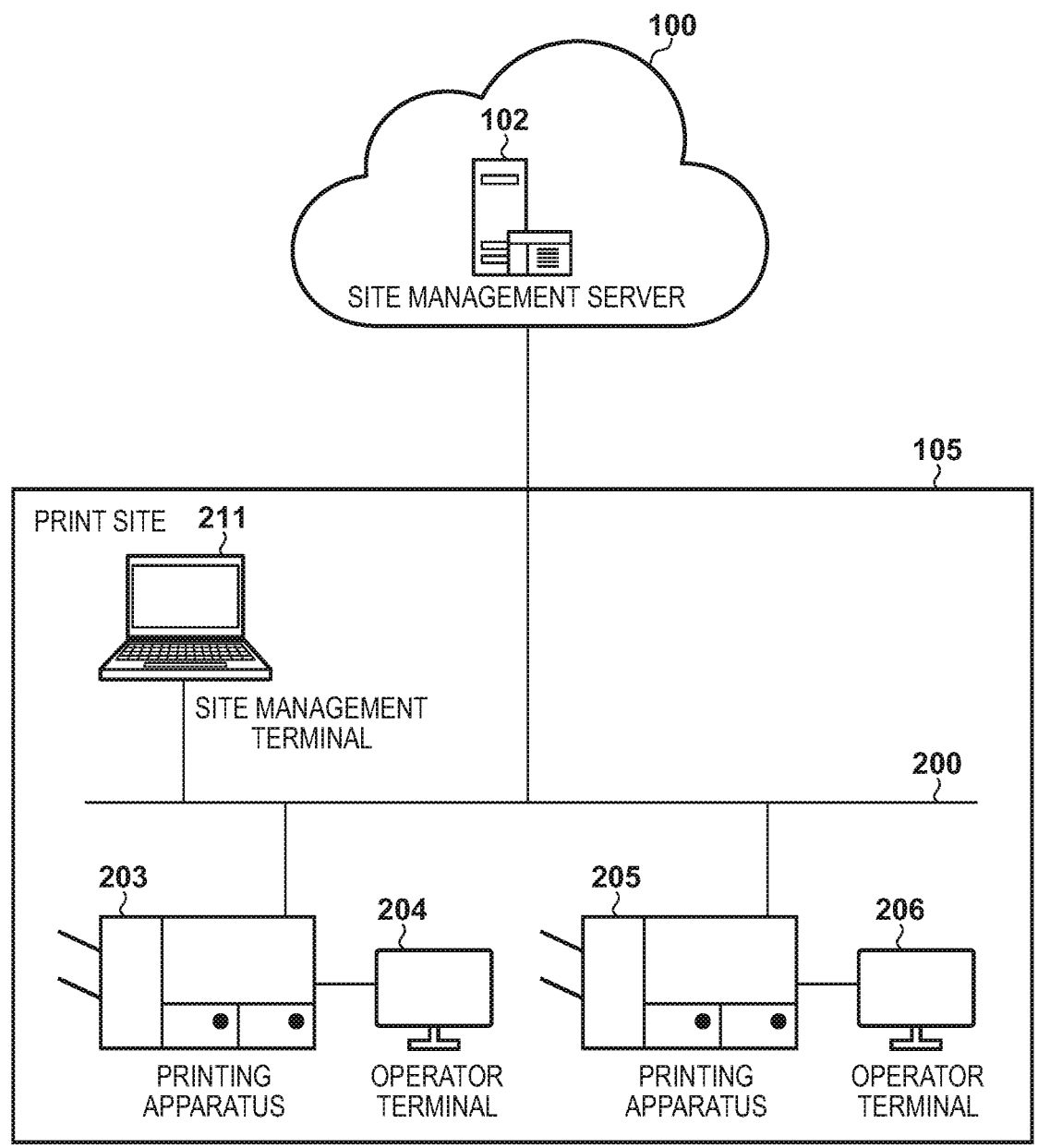
FIG. 2 depicts a view for explaining an arrangement centering around a print site of the printing system according to the embodiment.

FIG. 2 depicts a view for explaining an arrangement centering around the print site 105 of the printing system according to the embodiment.

A cloud environment 100 includes cloud servers such as a site management server 102 and a centralized management server 101 (FIG. 1) to be described later, and provides various kinds of services to terminal apparatuses connected via the Internet. Note that in the embodiment, a description will be made assuming that the site management server 102 and the centralized management server 101 are cloud servers. However, the present invention is not limited to this. The centralized management server 101 and the site management server 102 may be installed in each of the print site 105 and a site to perform a centralized management operation and used on-premises.

The site management server 102 is a server that manages printing apparatuses 203 and 205 operating in the print site 105. The site management server 102 obtains the information of the printing apparatuses 203 and 205 as the management targets. In addition, the site management server 102 transmits various kinds of control instructions to the printing apparatuses 203 and 205 in the management target site. Furthermore, the site management server 102 transmits information concerning the printing apparatuses operating in the management target site to the centralized management server 101 to be described later.

Note that the site management server 102 is a cloud server installed in the cloud environment 100, and is connected to a site management terminal 211 to be described later or the centralized management server 101 via the Internet. The centralized management server 101 is a server that integrally manages the information of at least one print site 105. The centralized management server 101 obtains the information of each print site from the site management server 102. The information includes, for example, the operation rates of the printing apparatuses 203 and 205 of the management targets or the life estimating information of each part of the printing apparatuses 203 and 205. In addition, the centralized management server 101 transmits the above-described print site information (the information concerning the printing apparatuses operating in the print site) to a centralized management terminal 111 (FIG. 1).

Note that the centralized management server 101 is a cloud server installed in the cloud environment 100 and is connected to the site management server 102 and the centralized management terminal 111 via the Internet. The centralized management terminal 111 is a terminal used by a centralized manager who works in the centralized management site. The centralized management terminal 111 displays print site information received from the centralized management server 101 on a display unit (not shown). The centralized manager refers to the print site information displayed on the display unit and verifies the operation rates of the printing apparatuses 203 and 205 of the print site and the cost of consumables.

A site management terminal 211 is a terminal (information processing apparatus) used by a color expert who manages the print site 105. The site management terminal 211 communicates with the site management server 102 and displays the information of the printing apparatuses 203 and 205 in the site 105 on a display unit (not shown). The color expert refers to the pieces of displayed information of the printing apparatuses 203 and 205 and uses them for a color management operation. The color management operation is an operation executed to keep the colors of an image printed by a printing apparatus to the desired quality standard of color, and includes a plurality of steps. Examples are a verification operation (color verification operation) of the color values of an image printed by a printing apparatus, and a color adjustment operation of performing adjustment such that the color values of a printed image satisfy a quality standard of color. In addition, the site management terminal 211 receives an instruction from the color expert and transmits various kinds of execution instructions to the printing apparatuses 203 and 205 in the print site 105.

The printing apparatuses 203 and 205 are printing apparatuses operating in the print site 105. The printing apparatuses 203 and 205 are, for example, electrophotographic printers or inkjet printers. The printing apparatuses 203 and 205 may each have an arrangement formed by connecting another apparatus to a printer. For example, a sheet feeder configured to expand the feeding capability or a post processing apparatus configured to perform various kinds of post processing for a sheet output from the printer is connected. In some cases, a print server (not shown) is connected to expand the printing capability.

Operator terminals 204 and 206 are apparatuses used by the operators of the printing apparatuses to perform various kinds of operations when using the printing apparatuses 203 and 205. The various kinds of operations are, for example, setting of the information of sheets stored in the feeder, and an execution instruction of the adjustment function of the printing apparatus. In the embodiment, console units provided on the printing apparatuses 203 and 205 will be described as the operator terminals 204 and 206. However, the present invention is not limited to this. In an arrangement formed by connecting the above-described print server, the input/output device of the print server may be used as the operator terminal. An intra-site network 200 connects the terminals in the print site 105 with each other and also connects each apparatus to an external network.

The hardware arrangements of various kinds of apparatuses according to this embodiment will be described next.

Figure 3:
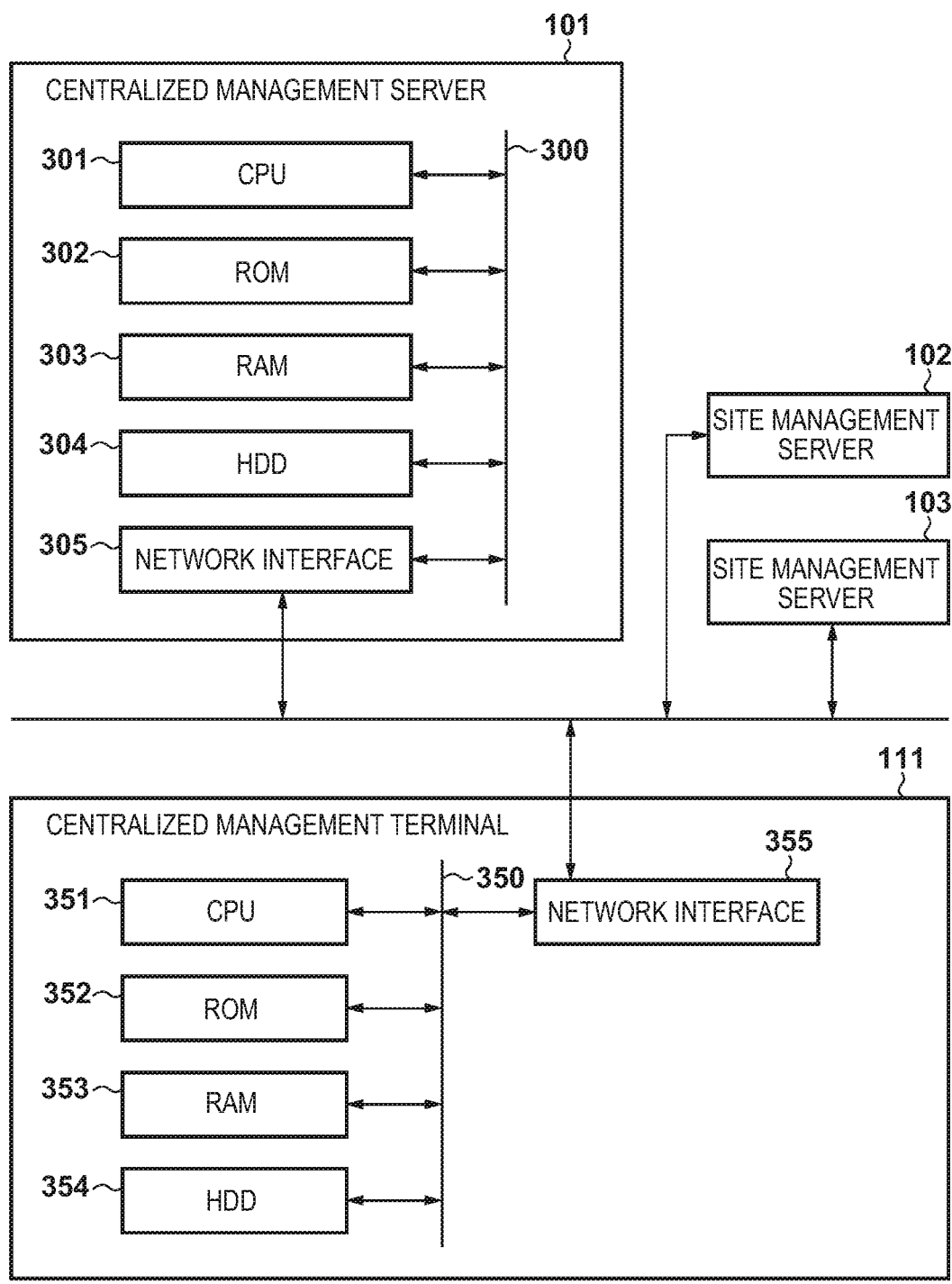
FIG. 3 is a block diagram for explaining a hardware arrangement including the centralized management server and the centralized management terminal of a centralized management system according to the embodiment.

FIG. 3 is a block diagram for explaining a hardware arrangement including the centralized management server 101 and the centralized management terminal 111 of the centralized management system according to the embodiment.

The hardware arrangement of the centralized management server 101 will be described first.

A CPU 301 deploys a control program stored in a ROM 302 or a hard disk (HDD) 304 into a RAM 303 and executes the deployed program, thereby generally controlling access to various kinds of devices connected to a system bus 300. The ROM 302 stores the control program executable by the CPU 301, and the like. The RAM 303 is configured to mainly function as the main memory or work area of the CPU 301 and expand the memory capacity by an optional RAM connected to an expansion port (not shown). The hard disk (HDD) 304 stores a boot program, various kinds of applications, font data, a user file, an editing file, and the like. Note that although the HDD 304 is used in this embodiment, an SD card, a flash memory, or the like may be used as an external storage device, in addition to the HDD 304. A network interface 305 performs data communication with the centralized management terminal 111 or the site management server 102 (the site management servers 102 and 103 in FIG. 3) via a network.

The hardware arrangement of the centralized management terminal 111 will be described next.

A CPU 351 deploys a control program stored in a ROM 352 or a hard disk (HDD) 354 into a RAM 353 and executes the deployed program, thereby generally controlling access to various kinds of devices connected to a system bus 350. The ROM 352 stores the control program executable by the CPU 351, and the like. The RAM 353 is configured to mainly function as the main memory or work area of the CPU 351 and expand the memory capacity by an optional RAM connected to an expansion port (not shown). The hard disk (HDD) 354 stores a boot program, various kinds of applications, font data, a user file, an editing file, and the like. Note that although the HDD 354 is used in the embodiment, an SD card, a flash memory, or the like may be used as an external storage device, in addition to the HDD 354. A network interface 355 performs data communication with the centralized management server 101 via a network.

Figure 4:
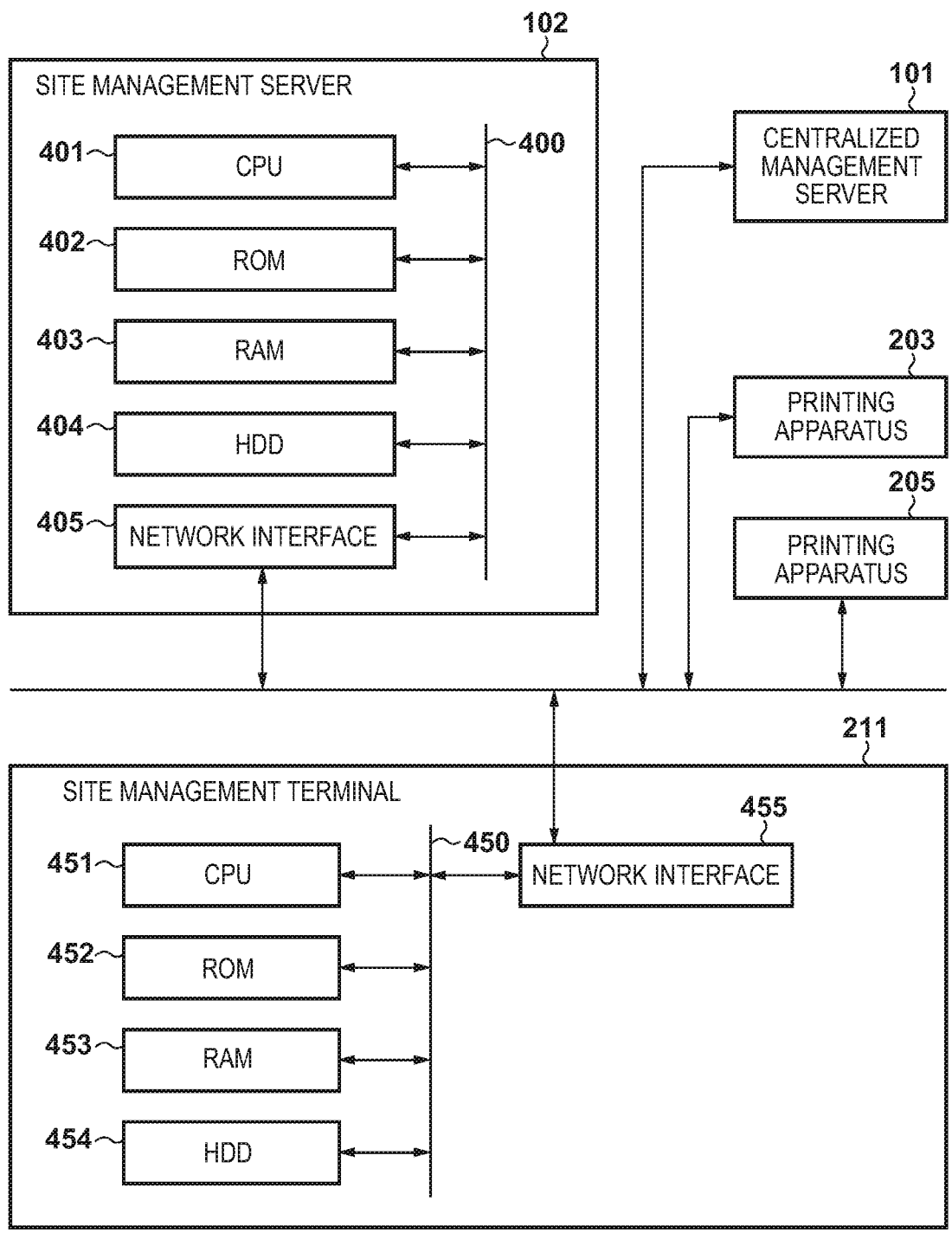
FIG. 4 is a block diagram for explaining a hardware arrangement including the site management server and the site management terminal of the centralized management system according to the embodiment.

FIG. 4 is a block diagram for explaining a hardware arrangement including the site management server 102 and the site management terminal 211 of the centralized management system according to the embodiment.

The hardware arrangement of the site management server 102 will be described first.

A CPU 401 deploys a control program stored in a ROM 402 or a hard disk (HDD) 404 into a RAM 403 and executes the deployed program, thereby generally controlling access to various kinds of devices connected to a system bus 400. The ROM 402 stores the control program executable by the CPU 401, and the like. The RAM 403 is configured to mainly function as the main memory or work area of the CPU 401 and expand the memory capacity by an optional RAM connected to an expansion port (not shown). The hard disk (HDD) 404 stores a boot program, various kinds of applications, font data, a user file, an editing file, and the like. Note that although the HDD 404 is used in the embodiment, an SD card, a flash memory, or the like may be used as an external storage device, in addition to the HDD 404. A network interface 405 performs data communication with the centralized management server 101, the site management terminal 211, and the printing apparatuses 203 and 205 via a network.

The hardware arrangement of the site management terminal 211 will be described next.

A CPU 451 deploys a control program stored in a ROM 452 or a hard disk (HDD) 454 into a RAM 453 and executes the deployed program, thereby generally controlling access to various kinds of devices connected to a system bus 450. The ROM 452 stores the control program executable by the CPU 451, and the like. The RAM 453 is configured to mainly function as the main memory or work area of the CPU 451 and expand the memory capacity by an optional RAM connected to an expansion port (not shown). The hard disk (HDD) 454 stores a boot program, various kinds of applications, font data, a user file, an editing file, and the like. Note that although the HDD 454 is used in this embodiment, an SD card, a flash memory, or the like may be used as an external storage device, in addition to the HDD 454. A network interface 455 performs data communication with the site management server 102 via a network.

Figure 5:
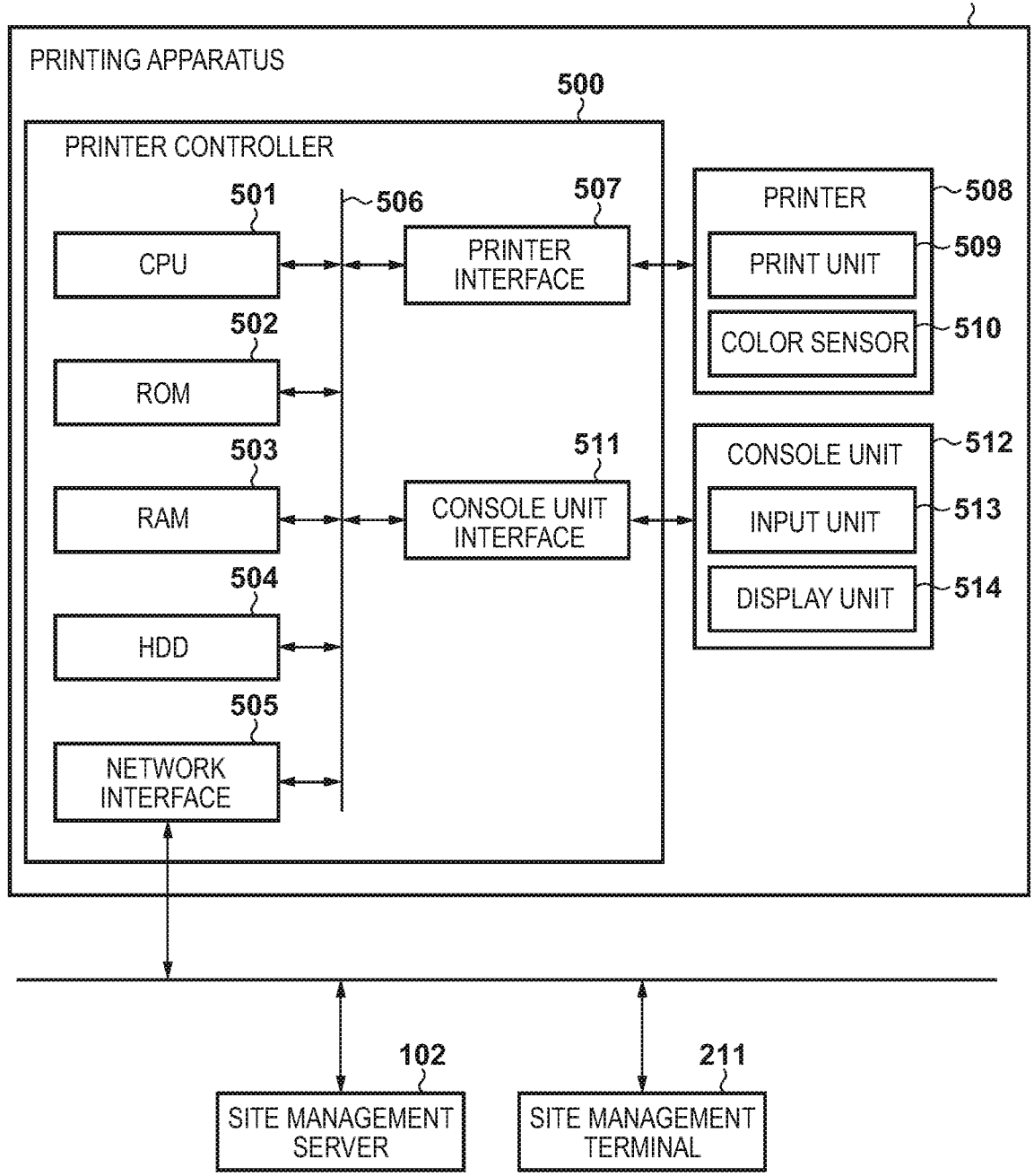
FIG. 5 is a block diagram for explaining the hardware arrangement of a printing apparatus according to the embodiment.

FIG. 5 is a block diagram for explaining the hardware arrangement of the printing apparatus 203 according to the embodiment. Note that the printing apparatus 205 has the same arrangement, and a description thereof will be omitted. The following description will be made using the printing apparatus 203 as an example, and the same applies to the printing apparatus 205.

A printer controller 500 is a controller of the printing apparatus 203 and performs processing necessary for execution of print processing, such as analysis of an entered print job and rendering processing to image data. Note that the following description will be made using an example in which the processing necessary for printing is performed by the printer controller 500 of the printing apparatus 203. However, the present invention is not limited to this. A form in which a print server (not shown) connected to the printing apparatus 203 performs processing such as reception and analysis of a print job and rendering to image data may also be employed. In this case, the print server transmits the image data after rendering and various kinds of data necessary for print processing to the printing apparatus 203. The printing apparatus 203 executes print processing by a printer 508 using the data received from the print server. A CPU 501 deploys a control program stored in a ROM 502 or a hard disk (HDD) 504 into a RAM 503 and executes the deployed program, thereby generally controlling access to various kinds of devices connected to a system bus 506. The ROM 502 stores the control program executable by the CPU 501, and the like. The RAM 503 is configured to mainly function as the main memory or work area of the CPU 501 and expand the memory capacity by an optional RAM connected to an expansion port (not shown). The hard disk (HDD) 504 stores a boot program, various kinds of applications, font data, a user file, an editing file, and the like. Note that although the HDD 504 is used in the embodiment, an SD card, a flash memory, or the like may be used as an external storage device, in addition to the HDD 504. A network interface 505 performs data communication with the site management server 102 or the site management terminal 211 via a network. A printer interface 507 controls image output to the printer 508. In addition, the printer interface 507 controls a color sensor 510 provided in the printer 508 and receives a measured result. The printer 508 includes at least an image forming unit (printer unit) 509 that performs a print operation, and the color sensor 510 that measures the colors of a printed product. In addition, a feeder and a post processing apparatus (neither are shown) may be connected.

In the embodiment, the color sensor 510 is installed on a sheet conveyance path in the printing apparatus 203. At least one color sensor 510 is arranged between the fixing unit and the discharge port of the print unit 509. The color sensor 510 can perform colorimetric measurement for an image transferred/fixed onto a sheet. Data obtained by the colorimetric measurement of the color sensor 510 are, for example, a spectral value, a chromatic value, and a density. A chart image printed by the print unit 509 is measured using the color sensor 510, and a correction table can be generated using the difference between the measured result and a target value. This will save the user from installing a chart image on a sensor to measure the chart image. For this reason, when the color sensor 510 is used, calibration can be executed automatically. A console unit interface 511 controls display on a display unit 514 provided on a console unit 512, and input of various kinds of information which an input unit 513 receives from the operator. As described above, in the embodiment, the console unit 512 has the same meaning as the operator terminals 204 and 206.

The software configurations of various kinds of apparatuses according to this embodiment will be described next.

Figure 6A:
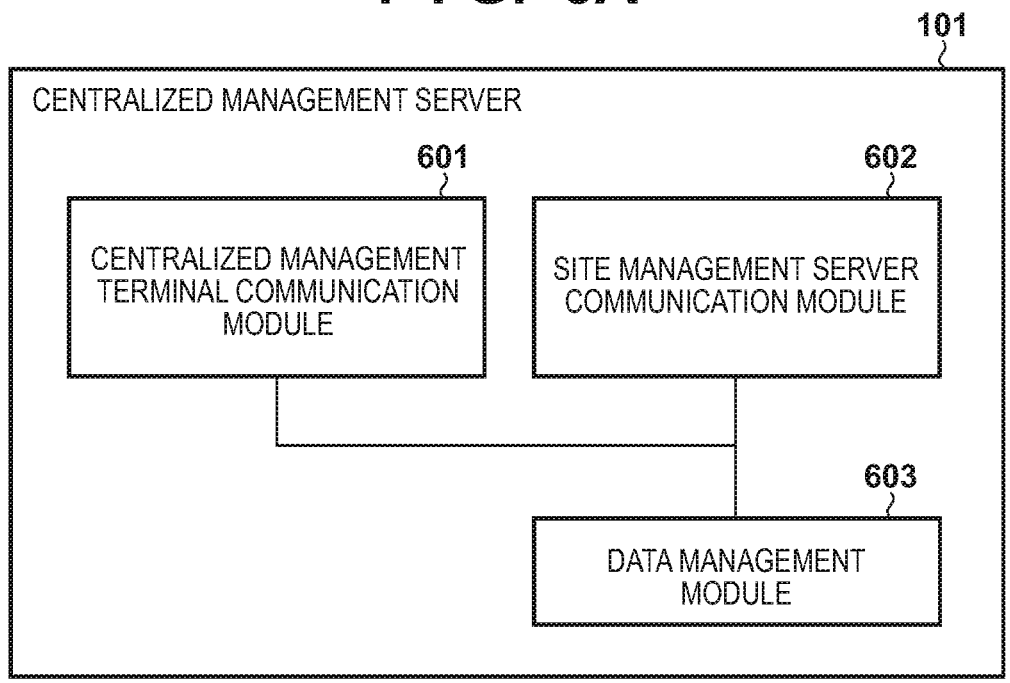
FIG. 6A is a block diagram for explaining the software configuration of the centralized management server according to the embodiment.

FIG. 6A is a block diagram for explaining the software configuration of the centralized management server 101 according to the embodiment. These software modules are stored as programs in the HDD 304 and implemented when the CPU 301 deploys the programs into the RAM 303 and executes them.

A centralized management terminal communication module 601 performs data communication with the centralized management terminal 111. For example, data for a centralized management application operating on the centralized management terminal 111 is generated and transmitted to the centralized management terminal 111. In addition, the centralized management terminal communication module 601 receives various kinds of instructions accepted from the centralized manager by the centralized management application.

A site management server communication module 602 executes data communication with another apparatus and obtains the information of the print site 105 of the color management target. For example, the site management server communication module 602 obtains the color state information of the printing apparatuses 203 and 205 in the print site 105. The color state information includes the measured value of an image printed by a printing apparatus, the color difference between the measured value and a target value, a result of determining whether or not the color difference is less than a threshold, and the measuring condition (profile) to perform colorimetric measurement. In addition, the site management server communication module 602 transmits various kinds of control instructions to the site management server 102 in accordance with an instruction accepted from the centralized manager by the centralized management application. For example, the site management server 102 instructs to change a notification interval concerning a periodical notification of the color state information for each printing apparatus from the site management server 102 to the centralized management server 101. A data management module 603 executes saving and management of various kinds of data concerning centralized management processing. For example, data such as the color state information of the print site 105, which is obtained by the site management server communication module 602, is stored. In addition, various kinds of content data to be distributed to the centralized management terminal 111 to execute the centralized management application are stored.

Figure 6B:
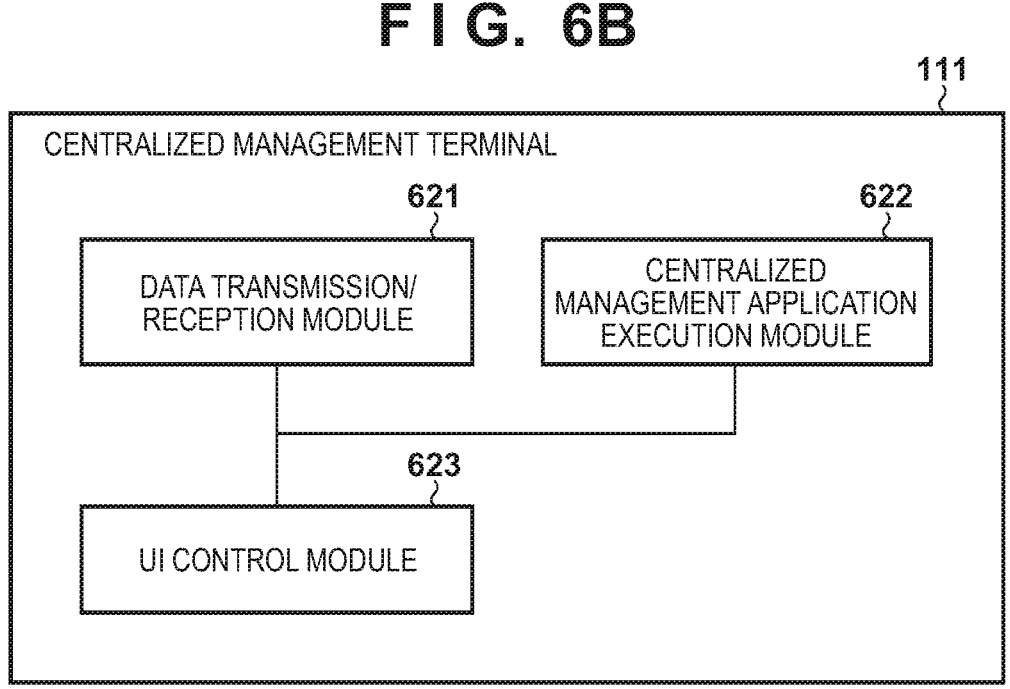
FIG. 6B is a block diagram for explaining the software configuration of the centralized management terminal.

FIG. 6B is a block diagram showing the software configuration of the centralized management terminal 111 according to the embodiment. These software modules are stored as programs in an HDD 354 and implemented when a CPU 351 deploys the programs into a RAM 353 and executes them.

A data transmission/reception module 621 performs data communication with the centralized management server 101. For example, the data transmission/reception module 621 receives various kinds of content data to be displayed by the centralized management application from the centralized management server 101. In addition, the data transmission/reception module 621 transmits various kinds of instruction information accepted from the centralized manager on the centralized management application to the centralized management server 101. For example, the data transmission/reception module 621 transmits an instruction to obtain the color state information of each printing apparatus in the print site 105 under the management. A centralized management application execution module 622 executes an application used by the centralized manager to manage the information of the print site 105 as the management target. A UI control module 623 mainly executes processing concerning UI screen display of the centralized management application and acceptance of an input operation of the user.

Figure 7A:
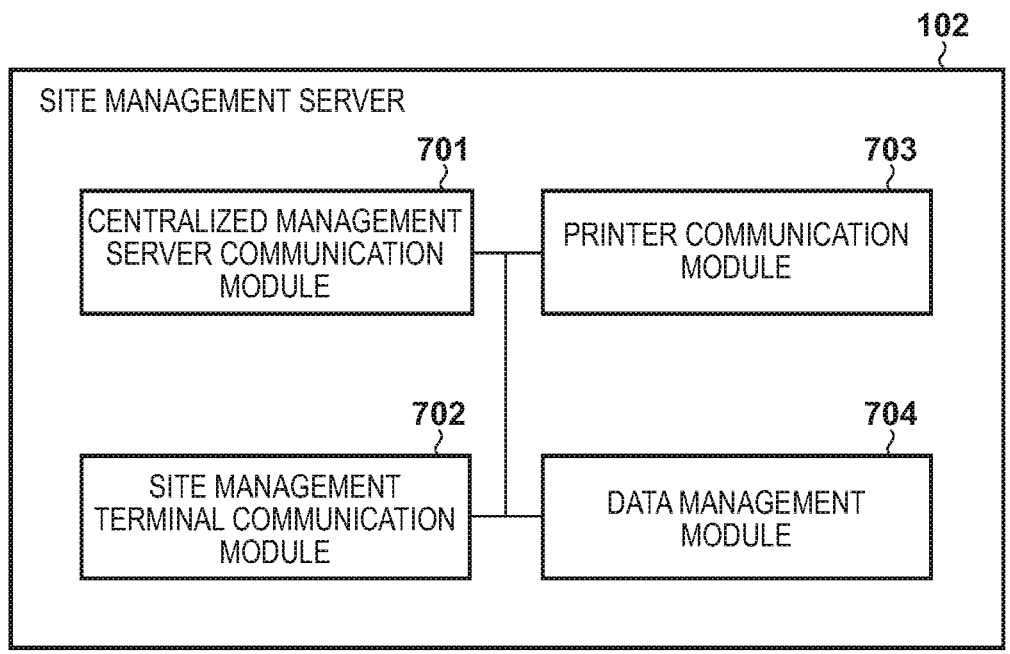
FIG. 7A is a block diagram for explaining the software configuration of the site management server according to the embodiment.

FIG. 7A is a block diagram for explaining the software configuration of the site management server 102 according to the embodiment. These software modules are stored as programs in the HDD 404 and implemented when the CPU 401 deploys the programs into the RAM 403 and executes them. Note that the site management server 103 has the same software configuration, and a description thereof will be omitted.

A centralized management server communication module 701 performs data communication with the centralized management server 101. For example, the centralized management server communication module 701 transmits various kinds of information of the print site 105 to the centralized management server 101. Alternatively, the centralized management server communication module 701 accepts an instruction from the centralized management server 101 and executes various kinds of control. A site management terminal communication module 702 performs data communication with the site management terminal 211. For example, the site management terminal communication module 702 generates data for a site management application operating on the site management terminal 211 and transmits it to the site management terminal 211. In addition, the site management terminal communication module 702 receives various kinds of instructions accepted from the color expert by the site management application. For example, the site management server communication module 602 receives an instruction for addition processing of the printing apparatus 203 of the management target or an execution instruction of color verification processing to the specific printing apparatus 203.

A printer communication module 703 performs data communication with the printing apparatus 203. For example, the printer communication module 703 transmits an execution instruction of color verification processing or color adjustment processing to the printing apparatus 203 in accordance with an instruction accepted from the color expert by the site management application. When color adjustment processing is instructed, the printer communication module 703 obtains, from the printing apparatus 203, result information of color adjustment processing executed by the printing apparatus 203. When color verification processing is instructed, the printer communication module 703 obtains data obtained by measuring a chart image by the printing apparatus 203 using the color sensor 510 and uses the data for determination control of color verification processing. A target value set in advance in a data management module 704 to be described later is compared with the received measured value to calculate a difference (color difference). Upon determining that the calculated difference is less than a threshold defined in advance, it is determined that the color of an image printed from the printing apparatus 203 satisfies a required quality standard of color. Satisfying the required quality standard of color means that the difference between the measured value of the color of the pointed image and the preset target value (reference) is small. Hence, the printer communication module 703 determines that the color value of the image printed from the printing apparatus 203 currently satisfies the quality standard of color, and instructs to record the color verification processing result in the data management module 704 and display the result on a UI control module 723 to be described later. On the other hand, upon determining that the difference is equal to or more than the threshold, it is determined that the color of the image printed from the printing apparatus 203 does not satisfy the quality standard of color. In this case, the printer communication module 703 transmits a recovery processing setting for color verification processing to the printing apparatus 203. For example, as the recovery processing, the printing apparatus 203 automatically executes color adjustment processing (calibration). Furthermore, after completion of color adjustment processing, the printer communication module 703 re-executes color verification processing.

The data management module 704 executes saving and management of various kinds of data concerning site management processing. For example, the data management module 704 stores the data of the printing apparatus 203 obtained by the printer communication module 703. In addition, the data management module 704 stores various kinds of content data to be distributed to the site management terminal 211 to execute the site management application. Furthermore, the data management module 704 saves and manages setting information, target value information, and the like associated with color verification processing or color adjustment processing.

Figure 7B:
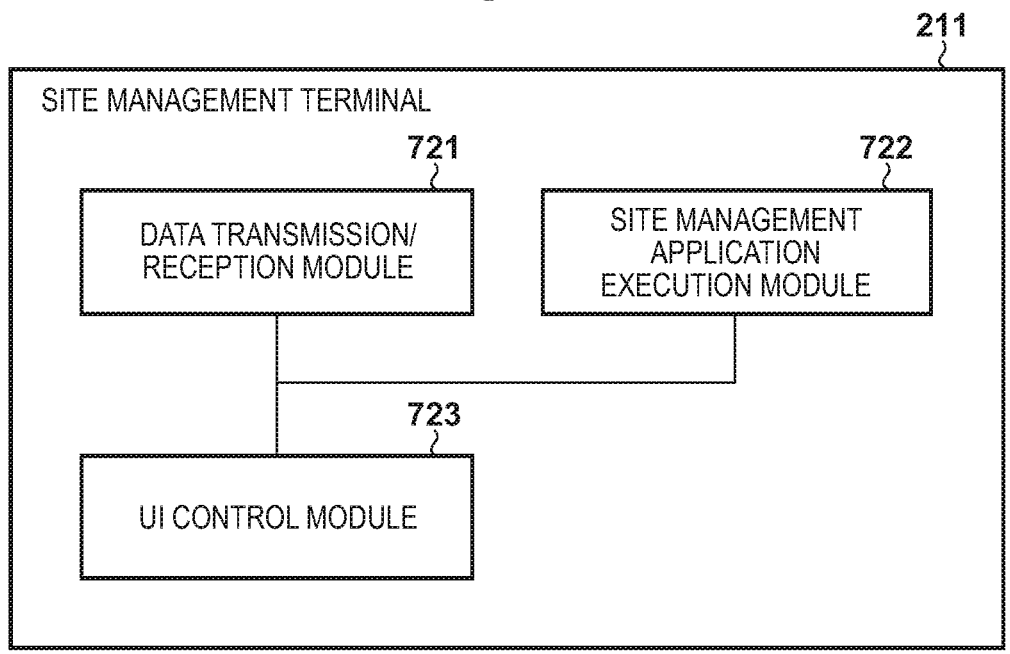
FIG. 7B is a block diagram for explaining the software configuration of the site management terminal.

FIG. 7B is a block diagram for explaining the software configuration of the site management terminal 211 according to the embodiment. These software modules are stored as programs in an HDD 454 and implemented when a CPU 451 deploys the programs into a RAM 453 and executes them.

A data transmission/reception module 721 performs data communication with the site management server 102. For example, the data transmission/reception module 721 receives various kinds of content data to be displayed by the site management application from the site management server 102. In addition, the data transmission/reception module 721 transmits various kinds of instruction information accepted from the color expert on the site management application to the site management server 102. For example, an instruction for addition processing of the printing apparatus 203 of the management target or an execution instruction of color verification processing to the specific printing apparatus 203 is transmitted.

A site management application execution module 722 executes an application used by the color expert to manage the printing apparatus 203 as the management target. The site management application execution module 722 obtains the information of the printing apparatus 203 in the print site 105 from the site management server 102. In addition, the site management application execution module 722 transmits, to the site management server 102, various kinds of control instructions for the printing apparatus 203 which are accepted from the color expert via a UI control module 723. The UI control module 723 mainly executes processing concerning UI screen display of the site management application and acceptance of an input operation of the user.

Figure 8:
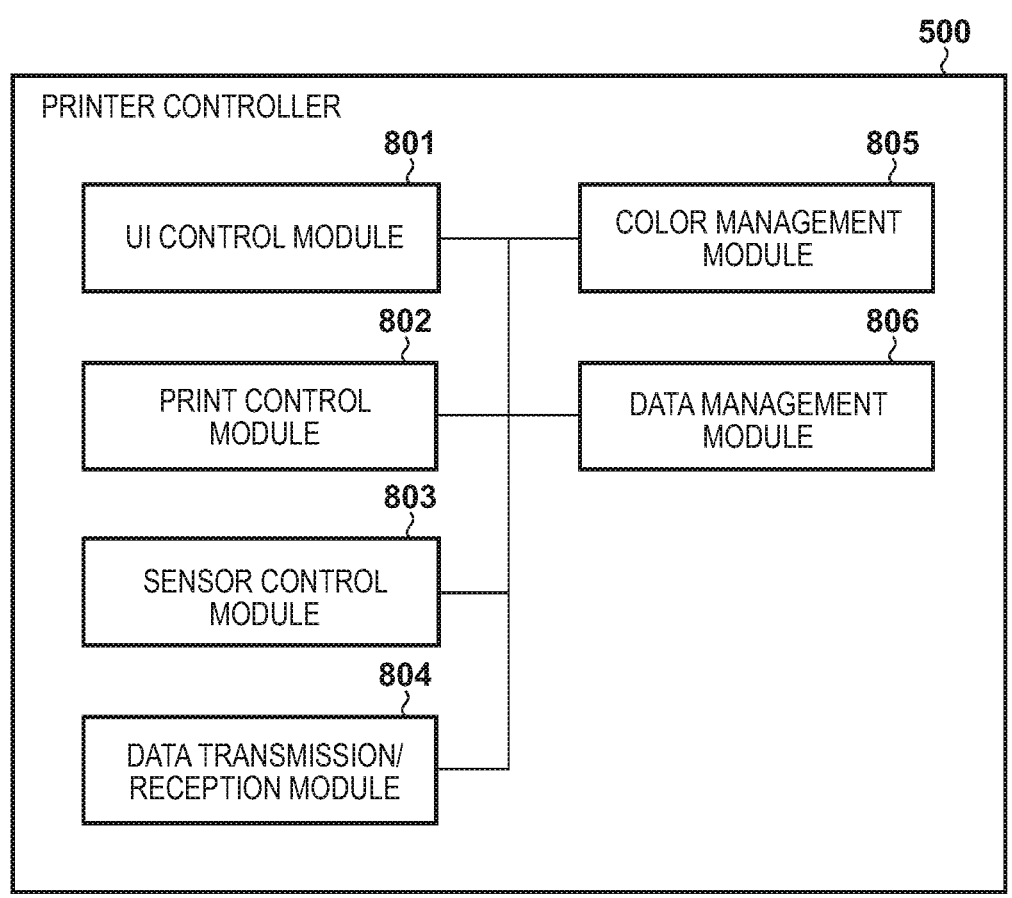
FIG. 8 is a block diagram for explaining the software configuration of the printer controller of the printing apparatus according to the embodiment.

FIG. 8 is a block diagram for explaining the software configuration of the printer controller 500 of the printing apparatus 203 according to the embodiment. These software modules are stored as programs in the HDD 504 and implemented when the CPU 501 deploys the programs into the RAM 503 and executes them. Note that the printing apparatus 205 has the same the software configuration, and a description thereof will be omitted.

A UI control module 801 controls display of the display unit 514 of the printing apparatus 203 and input from the input unit 513. A print control module 802 generates and manages print job data based on an execution instruction of a print job. For example, the print control module 802 performs processing necessary for print processing execution, such as analysis of a print job, rendering to image data, and image compression/decompression. In addition, the print control module 802 performs processing such as write/read to/from the HDD 504 concerning the generated print job and history management of printed jobs. A sensor control module 803 controls the above-described color sensor 510. The sensor control module 803 receives an instruction from the print control module 802, and executes colorimetric processing for a printed product such as a chart image to be used for calibration. The measured result is transmitted to a color management module 805 or a data management module 806 to be described later or to an external apparatus via a data transmission/reception module 804. The data transmission/reception module 804 manages data transmission/reception to/from the site management server 102. For example, the data transmission/reception module 804 transmits the information of a chart measured result or execution result of various kinds of functions of the printing apparatus 203 to the site management server 102. In addition, the data transmission/reception module 804 transmits/receives data concerning the output of a normal print job other than data concerning color management to/from an external apparatus. The color management module 805 controls processing for executing various kinds of functions configured to manage the quality of color that is the quality of a color of an image printed by the printing apparatus 203. More specifically, when the difference between a target value (reference) and the measured value of chart data for colorimetric measurement, which is printed by the printing apparatus 203, is equal to or less than a threshold, it is determined that the quality of color is satisfied. Management of the quality of color is performed.

An example of processing controlled by the color management module 805 will be described next.

Color verification processing is processing for verifying the quality of color of an image printed by the printing apparatus 203 at the timing of executing processing. When the start condition (verification execution condition) of color verification processing is satisfied, the color management module 805 of the printer controller 500 obtains chart data from the data management module 806. As for the color verification execution condition, for example, when printing of a predetermined value or more is executed, or when a predetermined time or more has elapsed from the previous color verification processing, it is determined that the color verification execution condition is satisfied. Then, the print control module 802 is instructed to print the chart data. Note that if measurement by the color sensor 510 is instructed for a chart image printed based on the chart data, the measurement instruction to the color sensor 510 is simultaneously transmitted to the print control module 802. However, the present invention is not limited to this, and may be applied to an embodiment in which the color management module 805 directly transmits the measurement instruction to the sensor control module 803. When the measured result of the printed chart image s obtained, the color management module 805 transmits the measured result to the site management server 102 via the data transmission/reception module 804. After the transmission, the color management module 805 receives a determination result using the measured result from the site management server 102. If the determination result is NG (indicates that the required quality standard of color is not satisfied), a recovery control instruction is received from the site management server 102 together with the determination result. The printer controller 500 controls each software module in accordance with the received instruction contents.

Note that in the embodiment, a description will be made assuming that the determination processing using the measured result is executed by the site management server 102. However, the present invention is not limited to this, and the determination processing may be executed by the printing apparatus 203. In this case, the color management module 805 calculates the difference between the measured value and the target value set in advance in the data management module 806 and determines whether or not the difference is less than a threshold defined in advance (satisfies a required quality standard of color). If the determination result is NG (if the difference is equal to or more than the threshold), processing is performed in accordance with the recovery control instruction received next from the site management server 102.

Color adjustment processing will be described next. Color adjustment processing is a so-called known calibration function, and various types of functions are provided to optimize a plurality of factors that influence the quality of color. Color adjustment processing in a case of executing a gray scale correction function will be described below. In color adjustment processing, first, chart data is printed, and the measured result of the printed chart image is obtained. Printing of the chart data and control contents concerning the colorimetric measurement of the chart image are the same as in the above-described color verification processing, and a detailed description thereof will be omitted. A correction parameter used to eliminate the difference between the obtained measured result and a target value set in advance in the data management module 806 is calculated and recorded in the data management module 806. The correction parameter is applied when outputting a subsequent print job and printing an image.

Color profile generation processing will be described next. In the color profile generation processing, the user of the printing apparatus creates a known color profile under desired conditions. The color management module 805 prints chart data and generates a color profile using the measured result of the chart image. Control contents concerning printing of the chart data and colorimetric measurement of the chart image are the same as those of the above-described color verification processing, and a detailed description thereof will be omitted. The generated color profile is saved by the data management module 806. From then on, the print control module 802 applies the color profile when executing a print job as an application target.

The data management module 806 saves and manages data concerning management (color management) of the measured result of the color of an image printed by the printing apparatus 203. Examples of the data concerning color management are parameter data concerning color management applied to a print job, such as the setting information of color verification processing or color adjustment processing, a preset target value, a measured value, the execution log of each processing, a color profile, and an adjustment table. In addition, the data management module 806 saves and manages data other than the data concerning color management. For example, the data management module 806 handles the information of the device configuration and consumables of the printing apparatus 203.

Functions provided by a color management system according to the embodiment will be described below.

Figure 9:
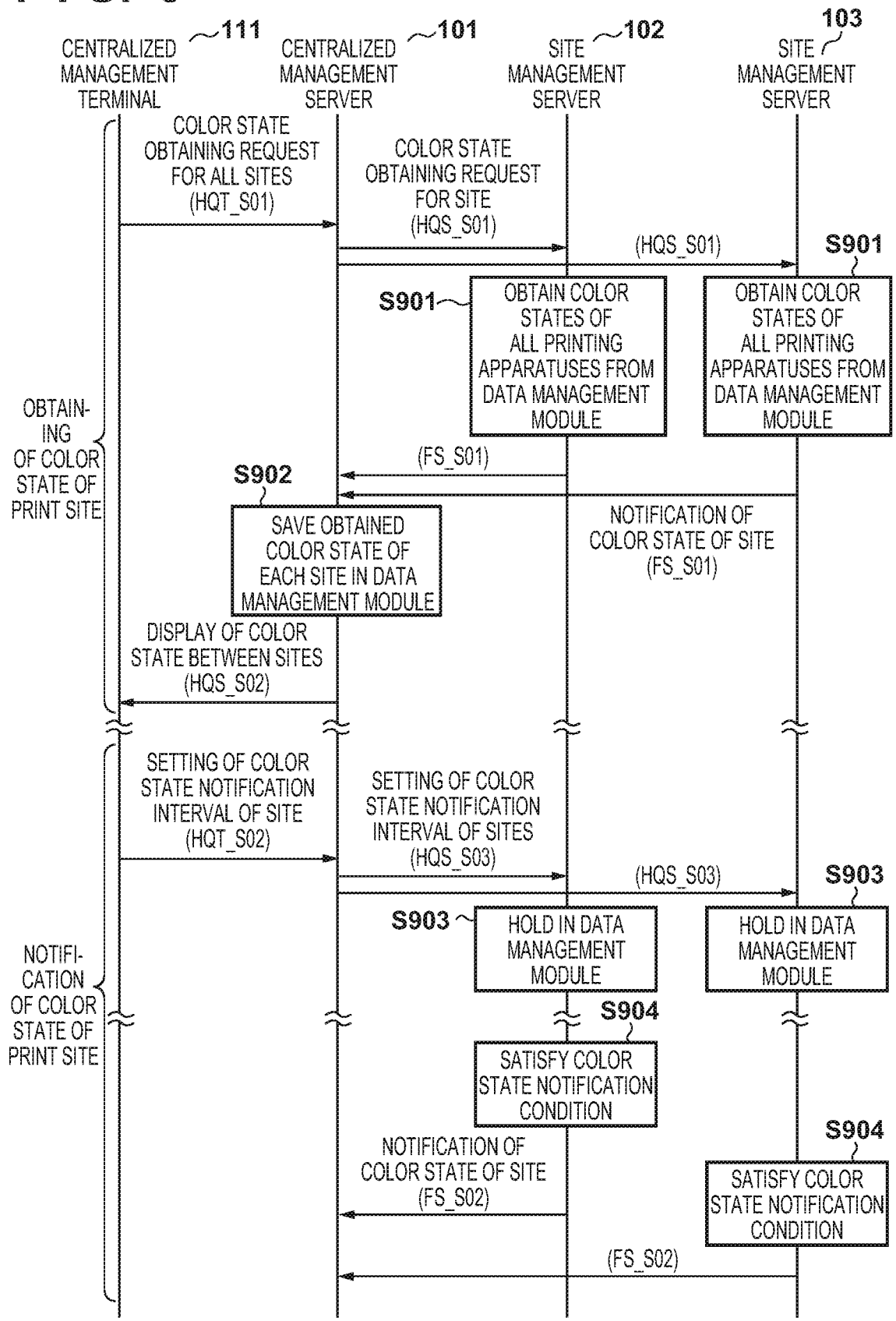
FIG. 9 is a sequence chart for explaining an example of a sequence concerning functions provided by a color management system according to the embodiment.

FIG. 9 is a sequence chart for explaining an example of a sequence concerning the functions provided by the color management system according to the embodiment.

<Function of Obtaining Color State Information of Print Site Based on Instruction of Centralized Manager>

Upon receiving an operation of the centralized manager, the centralized management terminal 111 requests the centralized management server 101 to obtain the color state information of printing apparatuses as the management targets installed in all print sites (HQT_S01). Upon receiving the request, the centralized management server 101 transmits the obtaining request of the color state information of the printing apparatuses 203 and 205 as the management targets installed in the sites to the one or more site management servers 102 and 103 of the management targets (HQS_S01). The site management servers 102 and 103 obtain the color state information of all printing apparatuses 203 and 205 installed in the print sites as the management targets from the data management modules 704 of the site management servers 102 and 103 (step S901), and notify the centralized management server 101 of the color state information (FS_S01). The centralized management server 101 saves, in the data management module 603, the color state information of the sites notified by the site management servers 102 and 103 (step S902). In addition, the centralized management server 101 transmits the color state information of each site to the centralized management terminal 111, and causes the UI of the centralized management terminal 111 to display the color state information (HQS_S02).

<Notification of Color State Information of Print Site>

Upon receiving an operation of the centralized manager, the centralized management terminal 111 transmits, to the centralized management server 101, an instruction to set an interval of sending a notification about the color state information of an operating printing apparatus from a print site to each print site (HQT_S02). Upon receiving the instruction, the centralized management server 101 transmits, to the one or more site management servers 102 and 103 of the management targets, the instruction to set the interval of sending the notification about the color state information of a printing apparatus operating in each site (HQS_S03). The site management servers 102 and 103 store the setting information of the color state information notification interval received from the centralized management server 101 in the data management modules 704 of the site management servers 102 and 103 (step S903). After that, based on the setting information of the notification interval, the site management servers 102 and 103 detect that time has reached the timing of notifying the centralized management server 101 of the color state information of each printing apparatus operating in each site (the color state information notification condition is satisfied) (step S904). Every time it is detected that the printing apparatus color state information notification condition is satisfied, the site management servers 102 and 103 notify the centralized management server 101 of the color state information of the printing apparatus operating in the site (FS_S02).

Figure 10:
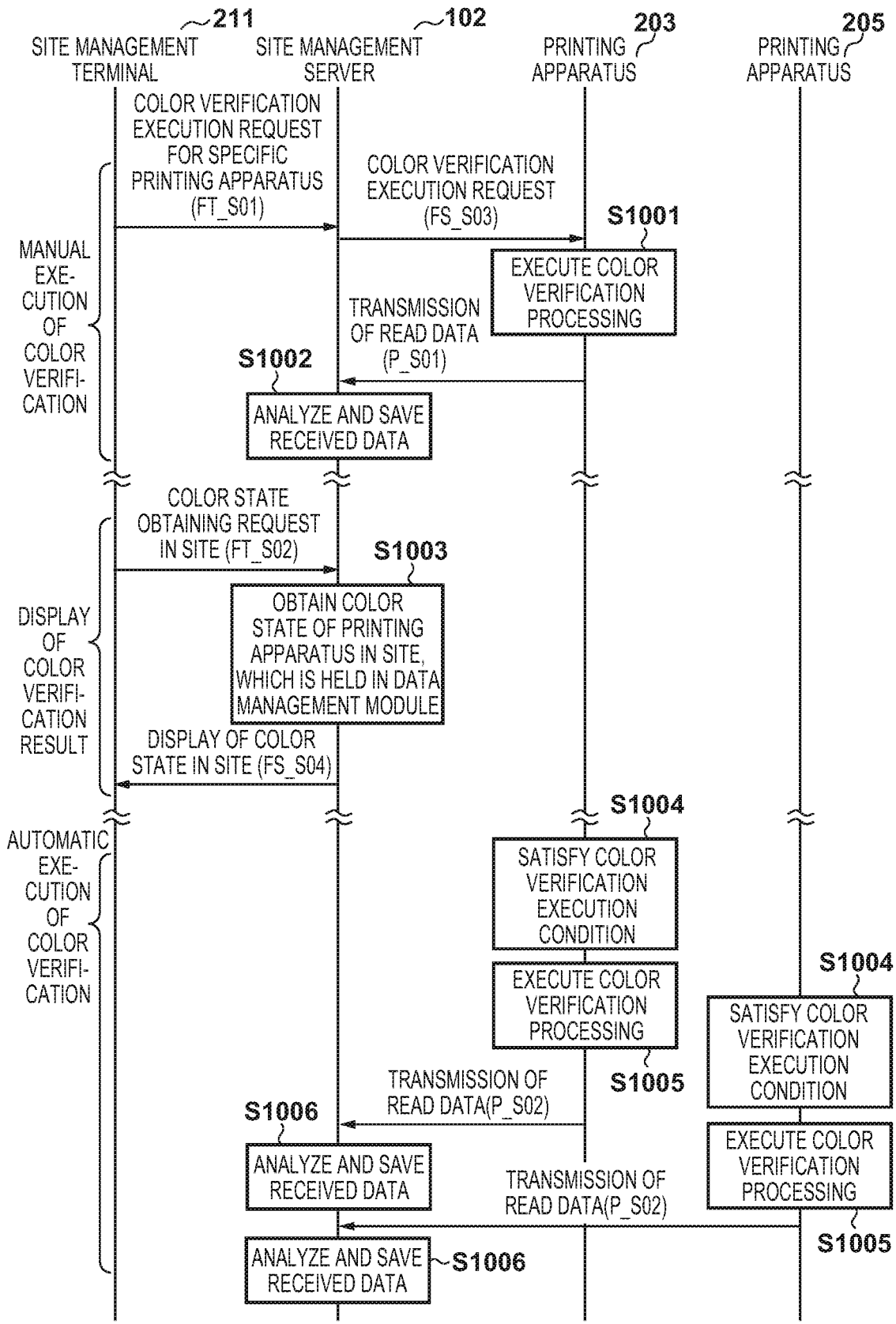
FIG. 10 is a sequence chart for explaining an example of a sequence concerning functions provided by the color management system according to the embodiment.

FIG. 10 is a sequence chart for explaining an example of a sequence concerning functions provided by the color management system according to this embodiment.

<Manual Execution of Color Verification Processing>

Upon receiving an operation of the color expert, the site management terminal 211 transmits an execution request of color verification processing of the specific printing apparatuses 203 and 205 to the site management server 102 (FT_S01). Here, assume that an execution request of color verification processing of the printing apparatus 203 is received. Detailed processing contents in the color verification processing have been described above. Upon receiving the request, the site management server 102 transmits the execution request of color verification processing to the printing apparatus 203 (FS_S03). Upon receiving the execution request, the printing apparatus 203 executes color verification processing (step S1001). The printing apparatus 203 transmits data (read data) representing the result of reading a chart image by the color sensor 510 to the site management server 102 (P_S01). The site management server 102 analyzes the read data received from the printing apparatus 203, and saves the analysis result in the data management module 704 of the site management server 102 (step S1002).

<Display of Color Verification Processing Result>

Upon receiving an operation of the color expert, the site management terminal 211 transmits an obtaining request of the color state information of each printing apparatus installed in the site to the site management server 102 (FT_S02). Upon receiving the request, the site management server 102 obtains the color state information of the printing apparatus 203 installed in the site, which is held in the data management module 704 (step S1003), transmits the color state information to the site management terminal 211, and causes the UI to display it (FS_S04).

<Automatic Execution of Color Verification Processing>

Upon detecting that a color verification execution condition to be described later is satisfied (step S1004), the at least one printing apparatus 203 installed in the site executes color verification processing (step S1005). In this color verification processing, a printed chart image is read by the color sensor 510, and the read data is transmitted to the site management server 102 (P_S02). Upon receiving the read data from the printing apparatuses 203 and 205, the site management server 102 analyzes the data and saves the data in the data management module 704 of the site management server 102 (step S1006).

FIGS. 11A and 11B are sequence charts for explaining color verification processing provided by the color management system according to this embodiment and an example of a sequence automatically executed by the system in accordance with a color verification result.

<Automatic Execution of Color Verification Processing and Recovery Processing>

The site management server 102 and the one or more printing apparatuses 203 and 205 in the print site perform control as shown in steps S1101 through S1103, like the control of automatic execution of color verification processing shown in FIG. 10. The site management server 102 analyzes data obtained by reading a chart image printed at the time of execution of color verification by the color sensor 510, and saves the data in the data management module 704. As the result of analysis of the read data, for example, if it is determined that the color value (color state) of an image printed by the printing apparatus 203 is not appropriate (does not satisfy a required quality standard of color), the site management server 102 requests the printing apparatus 203 to execute color adjustment (FS_S05). Upon receiving the request, the printing apparatus 203 executes color adjustment processing (step S1104). In addition, the printing apparatus 203 executes color verification processing anew after completion of color adjustment processing (step S1105), and transmits read data of the chart image by the color sensor 510 to the site management server 102 (P_S04). The site management server 102 analyzes the received read data again and saves it in the data management module 704 (step S1106). Here, as the result of analysis of the read data, if it is determined again that the color state of the printing apparatus 203 is not appropriate, the site management server 102 transmits a warning display request to the site management terminal 211 and the printing apparatus 203 (FS_S06 and FS_S07). The printing apparatus 203 displays a warning on the operator terminal 204 of the printing apparatus 203 in accordance with the warning display request (step S1108). Note that the control procedures of the site management server 102 and the printing apparatus 203 in this sequence will be described later in detail.

<Automatic Updating of Color Verification Profile>

The site management server 102 and the one or more printing apparatuses 203 and 205 installed in the site perform control in steps S1109 to S1111, as well as the control of automatic execution of color verification processing in FIG. 10. In addition, the site management server 102 analyzes data obtained by the color sensor 510 reading a chart image printed at the time of execution of color verification and saves the data in the data management module 704. Here, if the condition matches the updating condition of the color verification profile as the result of analysis of the read data, the site management server 102 saves the updated contents in the data management module 704 (step S1112), and transmits a color verification profile updating request to the printing apparatus 203 (FS_S08). In accordance with the contents of the received color verification profile updating request, the printing apparatus 203 updates a color verification setting held by the printing apparatus 203 and saves it in the data management module 806 (step S1113).

Functions other than the functions shown in the above sequence charts will be described below.

<Setting of Operating Information of Color Management Control for Printing Apparatus>

The site management server 102 distributes the operating information of color management control to the printing apparatuses 203 and 205 installed in the print site 105 of the management target. More specifically, the operating information of color management control is information necessary for executing color verification processing and color adjustment processing. The operating information of color verification processing includes, for example, the execution condition of color verification processing in the printing apparatuses 203 and 205, and the acceptance/rejection determination criterion for the result of color verification processing (the threshold of the color difference between the measured value and the target value), and the like. The operating information also includes the information of recovery processing of the printing apparatus in a case in which the color verification result is an error (the acceptance/rejection determination result for the verification result is "reject"). The operating information of color adjustment processing includes the patch arrangement of an adjustment chart, a colorimetric device, a chart print condition, and the like.

<Verification/Adjustment Processing in Printing Apparatus>

When the execution condition of color verification processing using the operating information is satisfied, color verification processing is executed. In addition, recovery processing such as color adjustment processing is executed in accordance with the result of color verification processing. Details of this processing will be described later. Note that the color verification processing and color adjustment processing need not be executed only when the execution condition of operating information distributed by the site management server 102 is satisfied. When the UI screen of the site management terminal 211 accepts the execution instructions of these processes from the color expert, the site management terminal 211 transmits the execution instructions to the printing apparatus 203 via the site management server 102. The printing apparatus 203 accepts the execution instructions and executes various kinds of processing. In addition, when the operator terminal 204 accepts the execution instructions of these processes from the operator, the printing apparatus 203 executes various kinds of processing in accordance with the execution instructions.

<Collection of Information of Printing Apparatuses 203 and 205 by Site Management Server 102>

The site management server 102 collects various kinds of information from the printing apparatuses 203 and 205 installed in the print site 105 of the management target. The information of the printing apparatuses 203 and 205 is, for example, color state information, and the execution history of color verification processing and the information of the execution results are obtained. In addition, as color adjustment processing information, the execution history information of color adjustment processing is obtained. In addition, pieces of information concerning degree of consumption of parts and the states of devices are obtained.

<Information Collection and Analysis by Site Management Server 102>

The site management server 102 processes the pieces of information obtained from the printing apparatuses 203 and 205 and generates data displayable on the UI screen of the site management terminal 211. The color expert accesses the site management server 102 from the site management terminal 211 and verifies the information of the printing apparatuses 203 and 205 on the UI screen of the site management application. By referring to the information displayed on the UI screen of the site management application, the color expert can understand the color management states of the plurality of printing apparatuses 203 and 205 operating in the print site 105 in a centralized fashion.

<Information Collection by Centralized Management Server 101>

The site management server 102 transmits the information of the print site 105 to the centralized management server 101. The print site information includes color state information obtained from information collected from the printing apparatuses 203 and 205 in the print site 105 and the operation rate information of the printing apparatuses 203 and 205. The centralized manager accesses the centralized management server 101 from the centralized management terminal 111 and verifies the above-described print site information on the UI screen of the centralized management application. By referring to the information displayed on the UI screen of the centralized management application, the centralized manager verifies whether or not the color management operation performed in the print site 105 is appropriate. In addition, the centralized manager unitarily verifies the information of the printing apparatuses 203 and 205 in the print site 105.

<Information Databases>

Details of information databases provided in the color management system according to this embodiment will be described next with reference to FIGS. 12A to 12C.

Figure 12B:
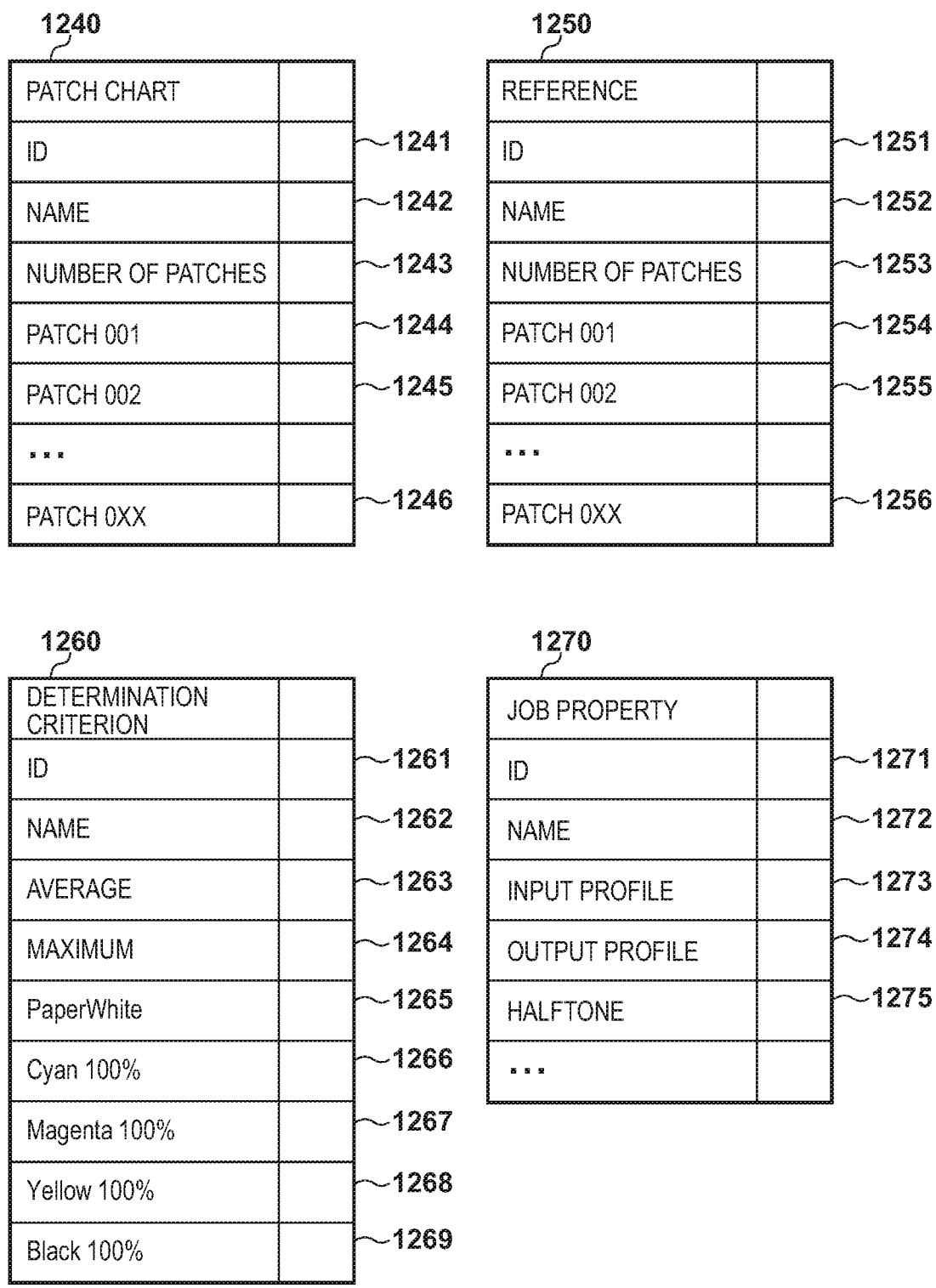
FIG. 12B depicts a view for explaining databases provided in the color management system according to the embodiment.

FIGS. 12A to 12C depict views for explaining databases provided in the color management system according to the embodiment.

Each of the databases is implemented when a program stored in the ROM 402 or the HDD 404 of the site management server 102 is loaded into the RAM 403 and executed by the CPU 401. The database is saved in the data management module 704 of the site management server 102. Each control module performs data updating and information transmission/reception to/from the centralized management server 101, the site management terminal 211, and the printing apparatuses 203 and 205, as needed. However, the saving location of the database is not limited to this and may be the data management module 603 of the centralized management server 101, or the data management module 806 of the printer controller 500 of the printing apparatus 203 or 205.

A color verification profile DB 1200 is a DB (database) collecting information that should be set for performing the color management operation. The color verification profile DB 1200 is formed by an ID 1201 used to identify saved information, a name 1202 to be displayed on a UI to be described later, and following information. Valid 1203 is information representing whether or not the color management operation set in the color verification profile is valid.

A color verification setting 1204 is link information to a color verification setting DB 1210 to be described later. A color verification execution condition 1205 is link information to a color verification execution condition DB 1220 to be described later. A color adjustment setting 1206 is link information to a color adjustment setting DB 1230 to be described later. A measured result 1207 is link information to a measured result DB 1280 (FIG. 12C) to be described later.

The color verification setting DB 1210 is a color verification setting DB collecting information that should be set for performing the color verification operation. The color verification setting DB 1210 includes an ID 1211 used to identify saved information, a name 1212 to be displayed on a UI to be described later, and following information. A patch chart 1213 is link information to a patch chart DB 1240 (FIG. 12B) to be described later. A reference 1214 is link information to a reference DB 1250 (FIG. 12B) to be described later. A determination criterion 1215 is link information to a determination criterion (threshold) DB 1260 (FIG. 12B) to be described later. A sheet 1216 is sheet information used when executing color verification processing. A job property 1217 is link information to a job property DB 1270 (FIG. 12B) to be described later.

The color verification execution condition DB 1220 is a color verification execution condition DB collecting execution condition information that should be set for performing the color verification operation. The color verification execution condition DB 1220 includes an ID 1221 used to identify saved information, a name 1222 to be displayed on a UI to be described later, and following information. A date 1223 is the information of a date that is one of the conditions to execute the color verification operation set in the color verification setting DB 1210. A printed sheet interval 1224 is the information of a printed sheet interval that is similarly one of the conditions to execute the color verification operation.

The color adjustment setting DB 1230 is a color adjustment setting DB collecting execution condition information that should be set for performing the color adjustment operation. The color adjustment setting DB 1230 includes an ID 1231 used to identify saved information, a name 1232 to be displayed on a UI to be described later, and following information. Adjustment 1233 is the information of a color adjustment operation. This is saved as information representing recovery processing to be executed when it is determined that the color adjustment operation is necessary as the result of the color verification operation. Recovery processing is, for example, calibration processing or profile creation processing. The color adjustment setting DB 1230 need not always save one color adjustment operation and may save a plurality of adjustment operations. Accordingly, information concerning the order to execute the plurality of adjustment operations may also be saved.

A patch chart DB 1240 shown in FIG. 12B is a patch chart DB collecting information that should be set for performing the color verification operation, and stores information concerning patch data used to print a chart image used in the color verification operation. The patch chart DB 1240 includes an ID 1241 used to identify saved information, a name 1242 to be displayed on a UI to be described later, and following information. The number 1243 of patches is the number of patches to be printed in a patch chart. Reference numerals 1244 through 1246 denote pieces of link information to a patch DB 12900 (FIG. 12C) to be described later. Patch DBs as many as the number of patches designated by the number 1243 of patches are created and saved.

The reference DB 1250 is a reference DB collecting information that should be set for performing the color verification operation. The information is information concerning the target value in each patch, which is saved in a form corresponding to patch chart information designated by the reference DB 1250. The reference DB 1250 includes an ID 1251 used to identify saved information, a name 1252 to be displayed on a UI to be described later, and following information. The number 1253 of patches is the number of patches to be printed in a patch chart. Reference numerals 1254 through 1256 denote pieces of link information to the patch DB 12900 (FIG. 12C) to be described later. Patch DBs as many as the number of patches designated by the number 1253 of patches are created and saved.

The determination criterion DB 1260 is a determination criterion DB collecting information that should be set for performing the color verification operation. The information is information concerning determination items used when comparing a calculated measured result with a target value to determine whether the quality of color is satisfied in the color verification operation and the thresholds of the determination items. The determination criterion DB 1260 includes an ID 1261 used to identify saved information, a name 1262 to be displayed on a UI to be described later, and following information. An average 1263 is the average of the difference amounts of all patches. A maximum 1264 is the maximum value in the difference amounts of all patches. Reference numeral 1265 denotes a value of a patch representing paper white; and 1266 through 1269, values of single-color solid patches of cyan, magenta, yellow, and black. As for the determination criterion, in the embodiment, the items 1263 through 1269 are used. However, the present invention is not limited to these items. Some of these items or a combination of items based on different indices may be used.

The job property DB 1270 is a job property DB collecting information that should be set for performing the color verification operation, and the information is information concerning the print settings of a patch chart to be printed in the color verification operation. The job property DB 1270 includes an ID 1271 used to identify saved information, a name 1272 to be displayed on a UI to be described later, and following information. Items to be described from the job property DB 1270 include items of settings necessary for a print job used to print a patch chart by the printing apparatus 203 or 205. These items include an input profile 1273 that is an input color profile, an output profile 1274 that is an output color profile, and a halftone 1275. The items are not limited to these items, as a matter of course. They are items set by the print control module 802 in the printing apparatus 203 and can be changed in accordance with the printing apparatus 203.

The measured result DB 1280 shown in FIG. 12C is a measured result DB collecting information concerning the measured result of the color verification operation. The information includes information concerning the measured values of patches printed and measured by the printing apparatuses 203 and 205. The measured result DB 1280 includes an ID 1281 used to identify saved information, and following information. An execution date 1282 is the information of an execution date in which the color verification operation is executed. The number 1283 of patches is the information of the number of patches to be printed in a patch chart. Reference numerals 1284 through 1286 denote pieces of link information to the patch DB 12900 to be described later. Patch DBs as many as the number of patches designated by the number 1283 of patches are created and saved.

The patch DB 12900 is a patch DB collecting information that should be set for performing the color verification operation. The patch DB 12900 includes an ID 12901 used to identify saved information, a name 12902 to be displayed on a UI to be described later, and following information. Reference numerals 12903 through 12906 denote pieces of input signal information of patches and correspond to cyan, magenta, yellow, and black, respectively. Reference numerals 12907 through 12909 denote pieces of information concerning target values that are references described concerning the reference DB 1250. In the embodiment, color state information as a target value will be described as the information of the CIE_L*a*b* color space used in general. Except that, any format is usable as long as the value allows the color verification operation to be performed. For example, the information of the CIE_XYZ color space or the information of density may be used.

Reference numerals 12910 through 12912 denote pieces of information concerning the measured result described concerning the measured result DB 1280. In the embodiment, the pieces of information are described in the same CIE_L*a*b* format as the pieces of information 12907 through 12909. However, information of another format may be used. However, to calculate a difference, each measured result information is preferably held in the same format as the target value.

A printing apparatus DB 12920 is a printing apparatus DB collecting the information of the printing apparatus 203 for which color management is to be performed by the color expert using the site management application. The printing apparatus DB 12920 includes an ID 12921 used to identify saved information, a name 12922 to be displayed on a UI to be described later, and following information. A color verification profile 12923 is link information to the color verification profile DB 1200. An IP address 12924 is the information of the IP address of the printing apparatus 203. The items are not limited to these items, as a matter of course, and any information used to identify the printing apparatus 203 can be used.

<Site Management Application UI>

Details of the site management application executed by the site management terminal 211 of the color management system according to this embodiment will be described next with reference to FIGS. 13 to 25. As described above, the site management application handles information necessary for the color expert to manage the printing apparatus. Only functions associated with color management will particularly be described here. UI screens to be explained here are generated/controlled by the site management application execution module 722 of the site management terminal 211 and displayed on a display unit (not shown) via the UI control module 723. The site management application also accepts an instruction from the color expert via the UI and a console unit (not shown).

Figure 13:
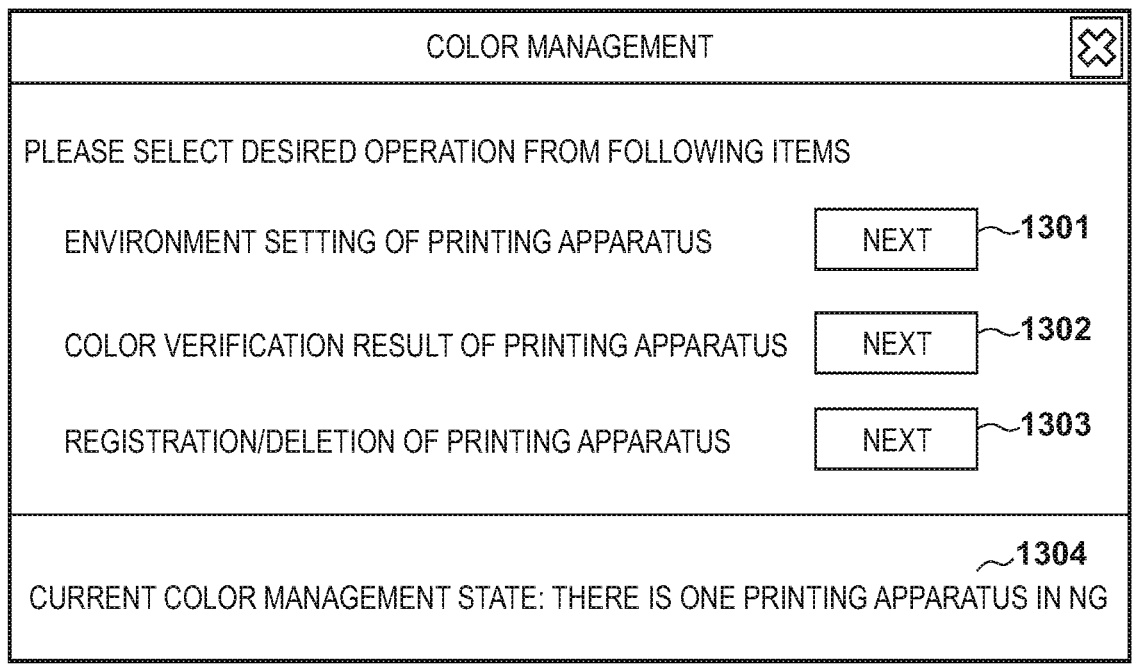
FIG. 13 depicts a view showing an example of the TOP screen of a site management application according to the embodiment.

FIG. 13 depicts a view showing an example of the TOP screen of the site management application according to this embodiment.

The color expert presses each of an environment setting button 1301, a color management result verification button 1302, and a color management target device registration/deletion button 1303 via the screen to advance to the next screen, thereby executing a corresponding operation. In addition, by a message 1304, the color expert can know whether or not a problem has occurred in any one of the management target printing apparatuses. For example, if a printing apparatus for which the latest color management result of the color verification profile whose operation is valid exhibits a determination result error exists among the printing apparatuses 203 and 205 managed by the color expert, the information is displayed by the message 1304. The displayed information is not limited to the information shown in FIG. 13, and any other information that is saved in the data management module 704 of the site management server 102 and is useful for the color expert may be displayed.

Figure 14:
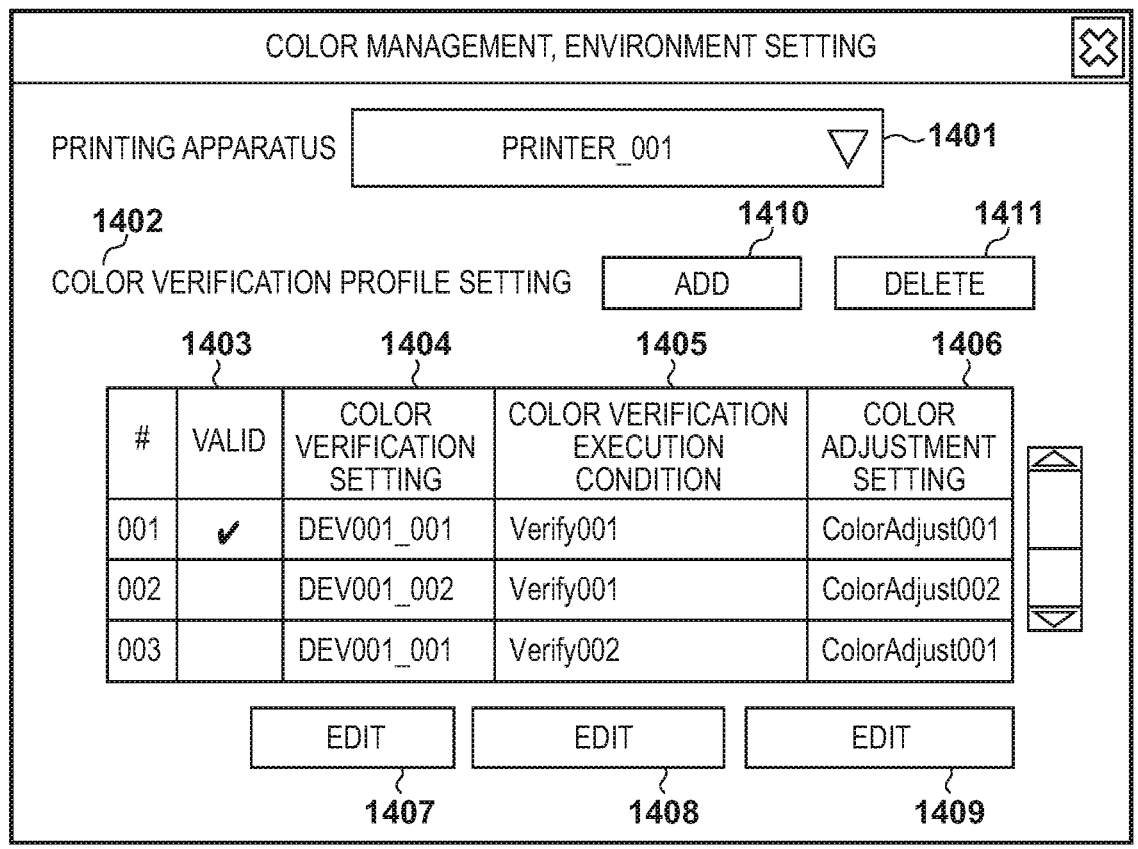
FIG. 14 depicts a view showing an example of the environment setting screen of a color management application.

FIG. 14 depicts a view showing an example of the environment setting screen of the color management application.

When the environment setting button 1301 is pressed in the screen shown in FIG. 13, the site management application execution module 722 generates the screen shown in FIG. 14, and the screen is displayed on the display unit (not shown) via the UI control module 723.

In 1401, the printing apparatus 203 as the target of the environment setting is selectively displayed. The site management application execution module 722 inquires of the data management module 704, obtains the printing apparatus DB 12920 of the printing apparatus 203 registered by the color expert, and displays it. In 1402, setting information to do a color verification profile setting is selectively displayed. When the printing apparatus 203 (printer_001) is selected, the site management application execution module 722 inquires of the data management module 704. The site management application execution module 722 obtains the information of the color verification profile DB 1200 which is the same as that for the selected printing apparatus 203 from the printing apparatus DB 12920 and displays it as the color verification profile setting 1402.

Color verification valid 1403 corresponds to the valid 1203 in the color verification profile DB 1200. If the color verification profile is valid, a state capable of showing the validity is displayed. When a column of the color verification valid 1403 of a color verification profile whose setting is to be changed is pressed, the site management application execution module 722 switches the setting from valid to invalid or from invalid to valid, and saves the information in the valid 1203 of the color verification profile DB 1200. In 1403 through 1406, names that are items corresponding to the color verification setting 1204 in the color verification profile DB 1200, respectively, and are saved in the settings are displayed. The row of an arbitrary valid color verification profile is selected by the color expert, and a setting change and the like are performed for the selected color verification profile. An editing button 1407 is a button used to make a transition to a screen to do a color verification setting to be described later. An editing button 1408 is a button used to make a transition to a screen to set a color verification execution condition to be described later. An editing button 1409 is a button used to make a transition to a screen to do a color adjustment setting to be described later.

An addition button 1410 is a button used to newly add a color verification profile setting. When the addition button 1410 is pressed, the site management application execution module 722 creates a new color verification profile DB 1200 and displays it on the color verification profile setting 1402. Exactly, the site management application execution module 722 transmits the information of the color verification profile DB 1200 to be newly created to the site management server 102, and the information is saved in the data management module 704. A deletion button 1411 is a button used to delete a color verification profile setting. If the deletion button 1411 is pressed in a state in which an arbitrary color verification profile is selected, the site management application execution module 722 transmits a notification representing that the selected color verification profile is to be deleted to the site management server 102. Accordingly, the selected color verification profile is deleted from the data management module 704 and also erased from the list.

Figure 15:
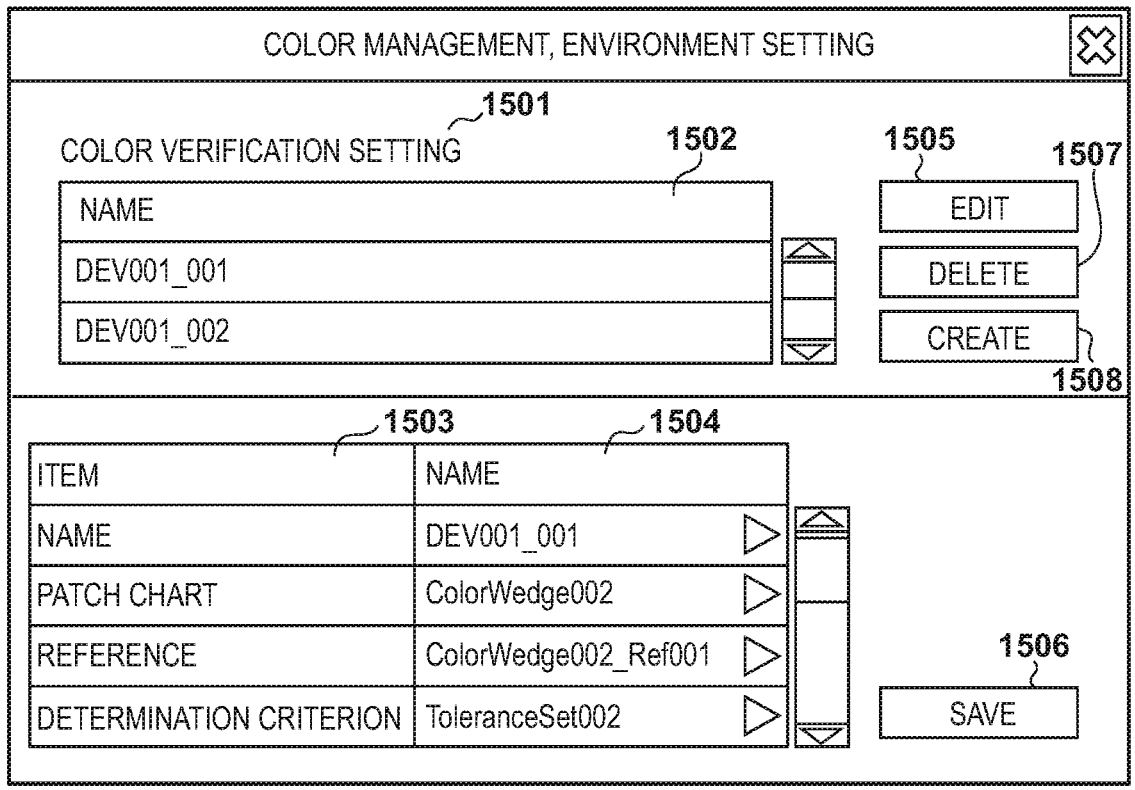
FIG. 15 depicts a view showing an example of a color verification setting editing screen in the environment setting of the site management application according to the embodiment.

FIG. 15 depicts a view showing an example of a color verification setting editing screen in the environment setting of the site management application according to the embodiment.

When the color verification setting editing button 1407 is pressed in the screen shown in FIG. 14, the site management application execution module 722 generates the UI, and the screen is displayed on the display unit (not shown) via the UI control module 723.

A color verification setting 1501 selectively displays the list of color verification settings linked with the printing apparatus 203 selected in the screen shown in FIG. 14. The site management application execution module 722 inquires of the data management module 704, obtains the color verification setting information, and displays it. A setting name list 1502 corresponds to the name 1212 in the obtained color verification setting DB 1210. When the color expert selects an arbitrary color verification setting in the setting name list 1502, the site management application execution module 722 inquires of the data management module 704, and obtains pieces of detailed information of the color verification setting. Then, the obtained pieces of detailed information of the color verification setting are displayed in an item 1503 and a name 1504. The items and the names displayed here are the information of the patch chart 1213 to the job property 1217 saved in the color verification setting DB 1210. The name displayed in the field of patch chart corresponds to the name 1242 in the patch chart DB 1240. The name displayed in the field of reference corresponds to the name 1252 in the reference DB 1250. In addition, the name displayed in the field of determination criterion corresponds to the name 1262 in the determination criterion DB 1260.

An editing button 1505 is a button used to edit the color verification setting. When the editing button 1505 is pressed, a state in which the contents of each item can be edited is set. Details of editing of each item will be described later. When the color expert performs desired setting editing and presses a saving button 1506, the site management application execution module 722 transmits editing information to the site management server 102, and updates the registered information in the data management module 704. A deletion button 1507 is a button used to delete a color verification setting. When the deletion button 1507 is pressed by the color expert, the site management application execution module 722 transmits a notification representing that the information of the color verification setting selected in the setting name list 1502 is to be deleted to the site management server 102. Accordingly, the information of the selected color verification setting is deleted from the data management module 704 and also erased from the setting name list 1502. A creation button 1508 is a button used to newly create a color verification setting. When the creation button 1508 is pressed by the color expert, the site management application execution module 722 creates a new color verification setting DB 1210 and displays it on the screen. Exactly, the site management application execution module 722 transmits the information of the color verification setting DB 1210 to be newly created to the site management server 102, and the information is saved in the data management module 704.

Figure 16:
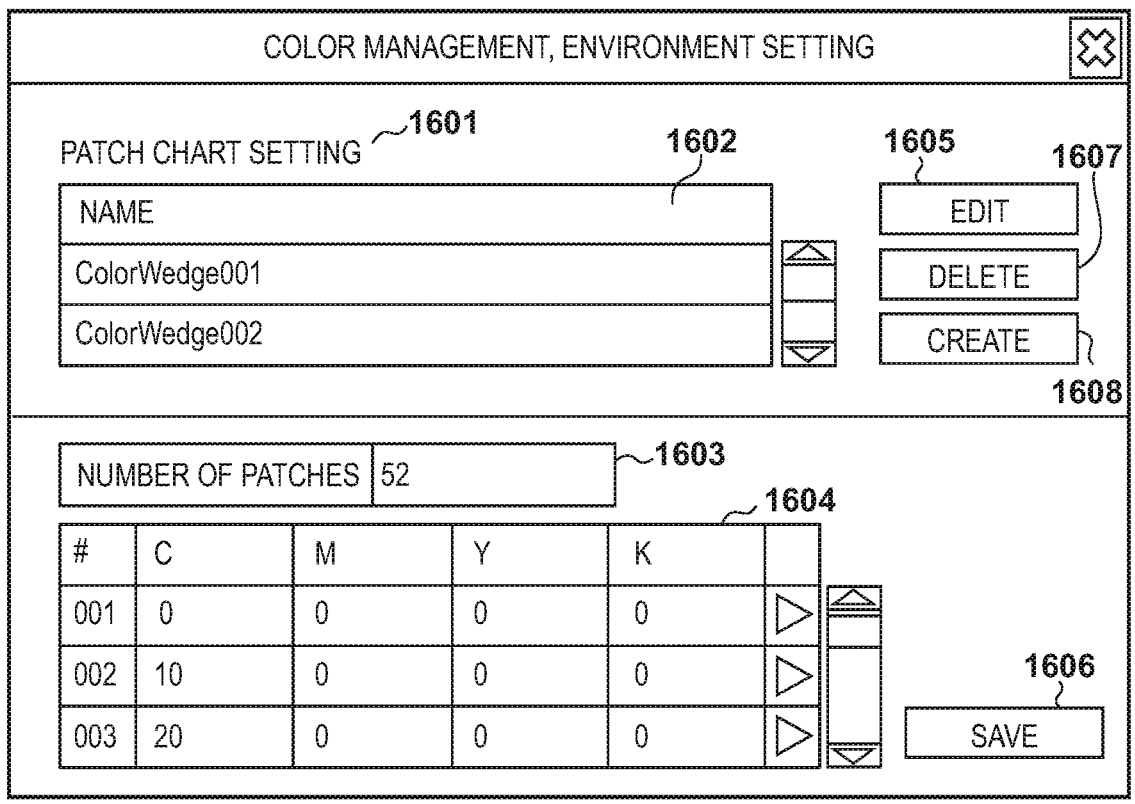
FIG. 16 depicts a view showing an example of a patch chart editing screen in the environment setting of the site management application according to the embodiment.

FIG. 16 depicts a view showing an example of a patch chart editing screen in the environment setting of the site management application according to the embodiment.

When the editing button 1505 is pressed in a state that the patch chart is selected in the item 1503 of the screen shown in FIG. 15, the site management application execution module 722 generates the UI, and the screen is displayed on the display unit (not shown) via the UI control module 723.

A list 1601 of patch chart settings selectively displays the list of patch chart settings linked with the printing apparatus 203 selected in the screen shown in FIG. 14. The site management application execution module 722 inquires of the data management module 704, obtains patch chart setting information. Then, the obtained patch chart setting information is displayed. A setting name list 1602 corresponds to the name 1242 in the obtained patch chart DB 1240. When the color expert selects an arbitrary patch chart setting in the setting name list 1602, the site management application execution module 722 inquires of the data management module 704, and obtains pieces of detailed information of the patch chart setting. Then, the obtained pieces of detailed information of the patch chart setting are displayed by the number 1603 of patches and a list 1604. The items and the names displayed here are pieces of information corresponding to the number 1243 of patches to the patch 1246 saved in the patch chart DB 1240. The number 1603 of patches is the number of patches saved in the number 1243 of patches. The list 1604 includes the pieces of input signal value information of the patches saved in 1244 through 1246 of the patch chart DB 1240. As for the items displayed in the list 1604, columns as many as the number of patches displayed in the number 1603 of patches are created. For example, as for the information of patch 001 (1244), detailed information exists in the patch DB 12900 at the link destination designated by patch 001 (1244), and pieces of information (12903 through 12906) of input signal values saved there are displayed. Buttons 1605 through 1608 are buttons used to edit, delete, create, and save a patch chart setting, respectively. The same operations as those of the buttons 1505 through 1508 in the color verification setting screen shown in FIG. 15 described above are performed for the patch chart DB 1240, and a description thereof will be omitted here.

FIG. 17 depicts a view showing an example of a reference editing screen in the environment setting of the site management application according to the embodiment.

When the editing button 1505 is pressed in a state that the reference is selected in the item 1503 of the screen shown in FIG. 15, the site management application execution module 722 generates the UI, and the screen is displayed on the display unit (not shown) via the UI control module 723.

A reference 1701 selectively displays the list of reference settings linked with the printing apparatus 203 selected in the screen shown in FIG. 14. The site management application execution module 722 inquires of the data management module 704, obtains reference setting information, and displays it. A setting name list 1702 corresponds to the name 1252 in the obtained reference DB 1250. When the color expert selects an arbitrary reference setting in the setting name list 1702, the site management application execution module 722 inquires of the data management module 704, and obtains pieces of detailed information of the reference setting. Then, the obtained pieces of detailed information of the reference setting are displayed by the number 1703 of patches and a list 1704. The items and the names displayed here correspond to the number 1253 of patches to the number 1256 of patches saved in the reference DB 1250.

The number 1703 of patches is the number of patches saved in the number 1253 of patches. The list 1704 corresponds to the input signal value information of the patches saved in 1254 through 1256 of the reference DB 1250, and the target value information. As for the items displayed in the list 1704, columns as many as the number of patches displayed in the number 1703 of patches are created. For example, as for the information of patch 001 (1254), detailed information exists in the patch DB 12900 at the link destination designated by 1254 in the reference DB 1250. The information (12903 through 12906) of the input signal values and the information (12907 through 12909) of the target values, which are saved in the patch DB 12900, are displayed. Buttons 1705 through 1708 are buttons used to edit, delete, create, and save a reference setting, respectively. The same operations as those of the buttons 1505 through 1508 used to perform editing, deletion, creation, and saving in the color verification setting screen shown in FIG. 15 described above are performed for the reference DB 1250, and a description thereof will be omitted here.

FIG. 18 depicts a view showing an example of a determination criterion editing screen in the environment setting of the site management application according to the embodiment.

When the editing button 1505 is pressed in a state that the determination criterion is selected in the item 1503 of the screen shown in FIG. 15, the site management application execution module 722 generates the UI, and the screen is displayed on the display unit (not shown) via the UI control module 723.

A determination criterion 1801 selectively displays the list of determination criterion settings linked with the printing apparatus 203 selected in the screen shown in FIG. 14. The site management application execution module 722 inquires of the data management module 704, obtains determination criterion setting information, and displays it. A setting name list 1802 corresponds to the name 1262 in the obtained determination criterion DB 1260. When the color expert selects an arbitrary determination criterion setting in the setting name list 1802, the site management application execution module 722 inquires of the data management module 704, obtains pieces of detailed information of the determination criterion setting, and displays them in a list 1803. The items and the names displayed here correspond to the pieces of information of the averages 1263 through 1269 saved in the determination criterion DB 1260. Buttons 1804 through 1807 are buttons used to edit, delete, create, and save a determination criterion setting, respectively. The same operations as those of the buttons 1505 through 1508 used to perform editing, deletion, creation, and saving in the color verification setting screen shown in FIG. 15 described above are performed for the determination criterion DB 1260, and a description thereof will be omitted here.

Figure 19:
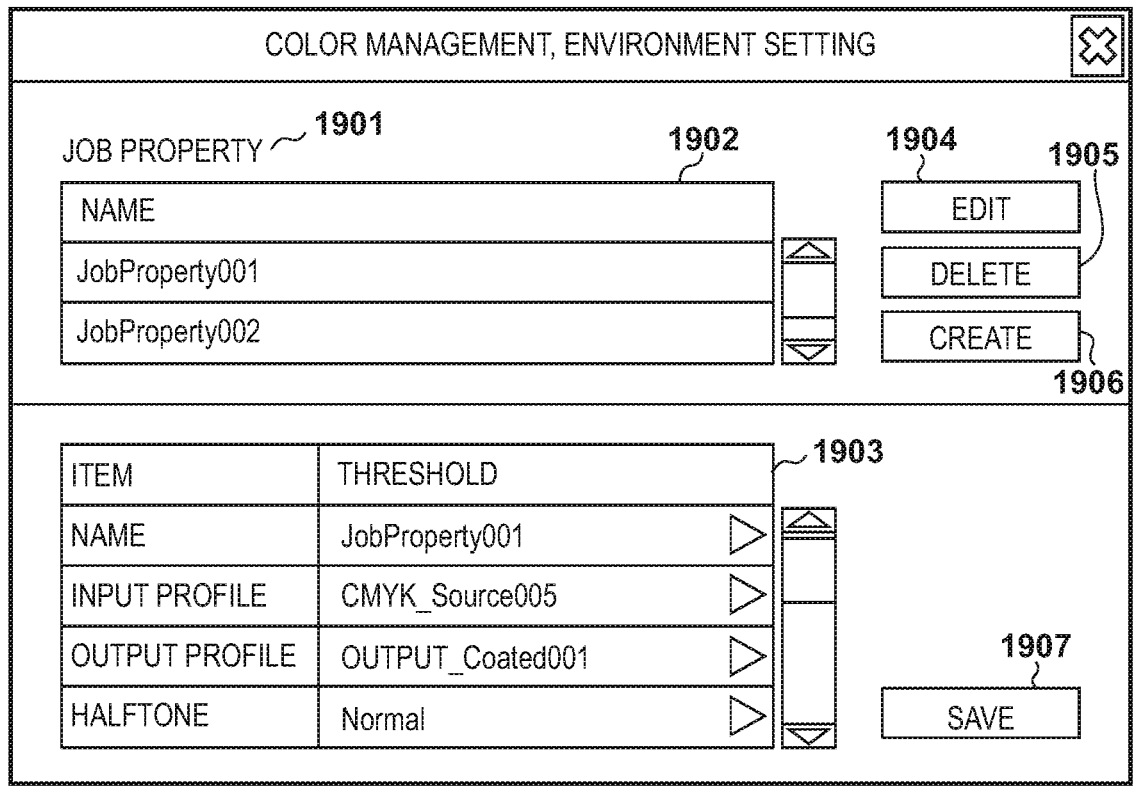
FIG. 19 depicts a view showing an example of a job property editing screen in the environment setting of the site management application according to the embodiment.

FIG. 19 depicts a view showing an example of a job property editing screen in the environment setting of the site management application according to the embodiment.

When the editing button 1505 is pressed in a state that a job property (not shown) is selected in the screen shown in FIG. 15, the site management application execution module 722 generates this UI, and the screen is displayed on the display unit (not shown) via the UI control module 723. A job property 1901 selectively displays the list of job property settings linked with the printing apparatus 203 selected in 1401 shown in FIG. 14. The site management application execution module 722 inquires of the data management module 704, obtains job property setting information, and displays it. A setting name list 1902 corresponds to the name 1272 in the obtained job property DB 1270. When the color expert selects an arbitrary job property setting in the setting name list 1902, the site management application execution module 722 inquires of the data management module 704, obtains pieces of detailed information of the job property setting, and displays them in a list 1903. The items and the names displayed in the list 1903 correspond to the input profiles 1273 through 1275 saved in the job property DB 1270. Buttons 1904 through 1907 are buttons used to edit, delete, create, and save a job property setting, respectively. The same operations as those of the buttons 1505 through 1508 used to perform editing, deletion, creation, and saving in the color verification setting screen shown in FIG. 15 described above are performed for the job property DB 1270, and a description thereof will be omitted here.

Figure 20:
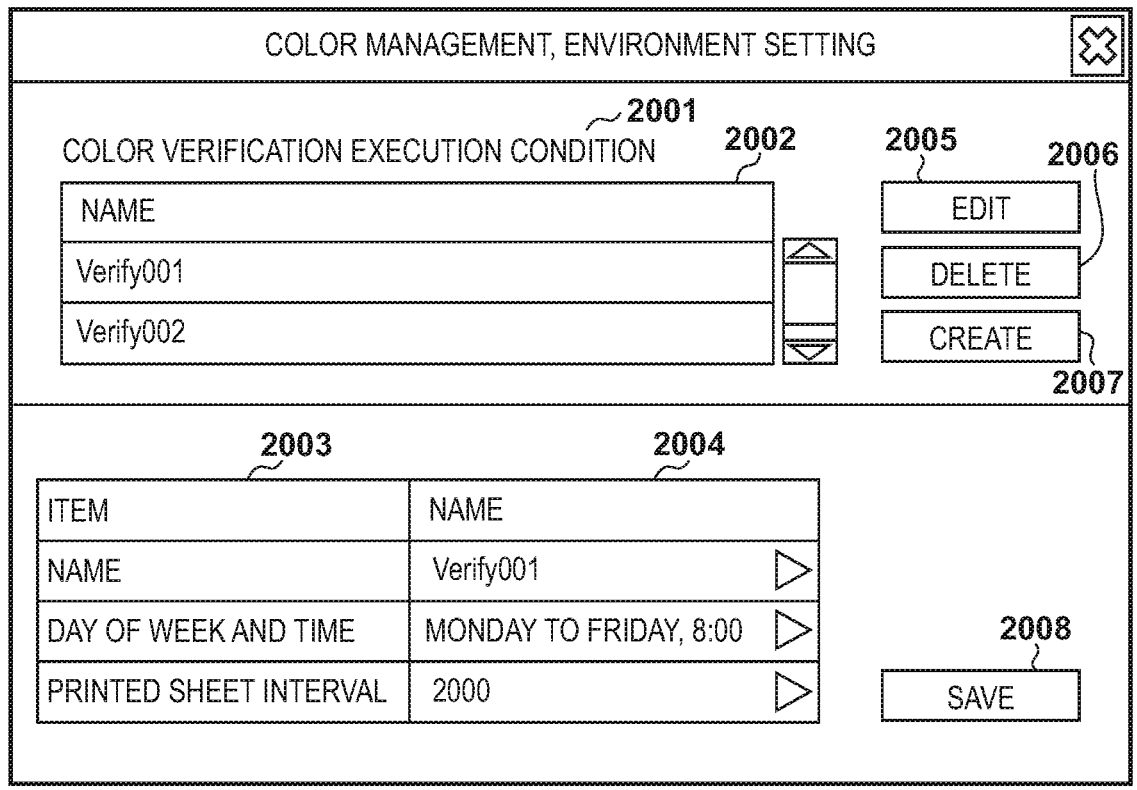
FIG. 20 depicts a view showing an example of a color verification execution condition editing screen in the environment setting of the site management application according to the embodiment.

FIG. 20 depicts a view showing an example of a color verification execution condition editing screen in the environment setting of the site management application according to the embodiment.

When the editing button 1408 of the color verification execution condition is pressed in the screen shown in FIG. 14, the site management application execution module 722 generates this UI, and the screen is displayed on the display unit (not shown) via the UI control module 723. A color verification execution condition 2001 selectively displays the list of color verification execution conditions. The site management application execution module 722 inquires of the data management module 704, obtains color verification execution condition information, and displays it. A setting name list 2002 corresponds to the name 1222 in the obtained color verification execution condition DB 1220. When the color expert selects an arbitrary color verification execution condition in the setting name list 2002, the site management application execution module 722 inquires of the data management module 704, obtains pieces of detailed information of the color verification execution condition, and displays them in an item 2003 and a name 2004. The items and the names displayed here correspond to the name 1222 and the printed sheet interval 1224 saved in the color verification execution condition DB 1220. Buttons 2005 through 2008 are buttons used to edit, delete, create, and save a color verification execution condition, respectively. The same operations as those of the buttons 1505 through 1508 used to perform editing, deletion, creation, and saving in the color verification setting screen shown in FIG. 15 described above are performed for the color verification execution condition DB 1220, and a description thereof will be omitted here.

Figure 21:
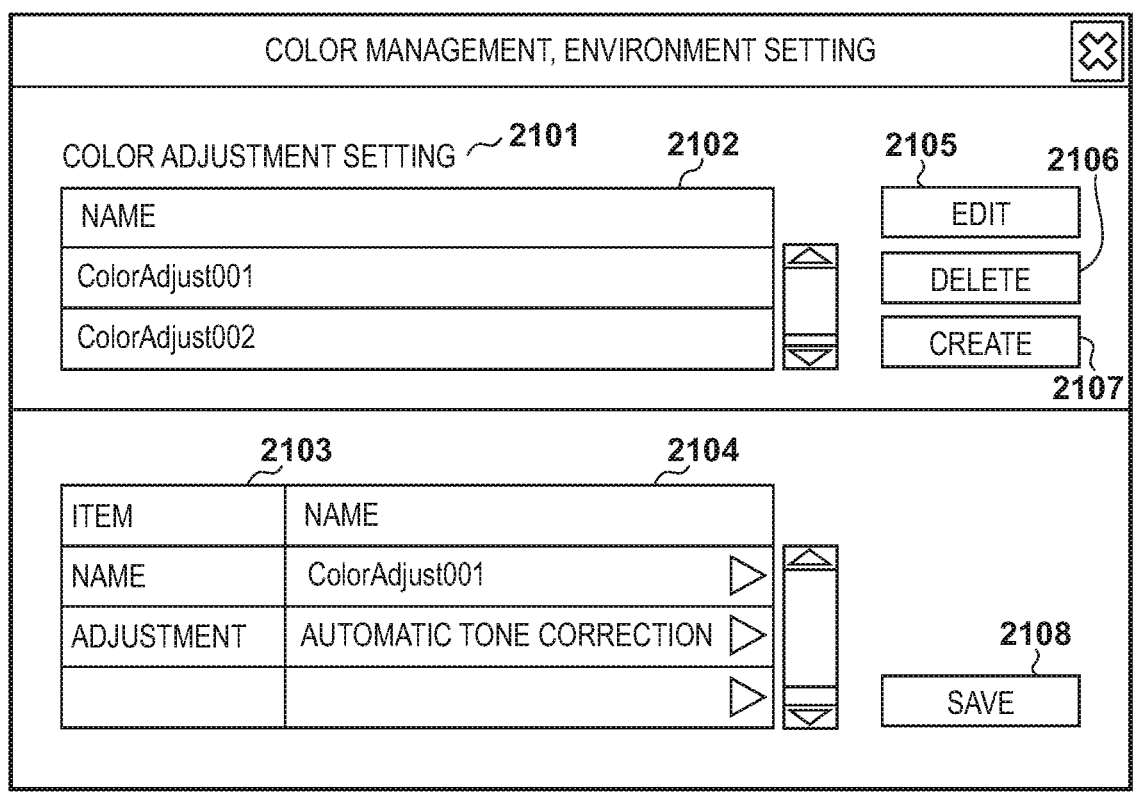
FIG. 21 depicts a view showing an example of a color adjustment setting editing screen in the environment setting of the site management application according to the embodiment.

FIG. 21 depicts a view showing an example of a color adjustment setting editing screen in the environment setting of the site management application according to the embodiment.

When the editing button 1409 of the color adjustment setting in the screen shown in FIG. 14 is pressed, the site management application execution module 722 generates this UI, and the screen is displayed on the display unit (not shown) via the UI control module 723. A color adjustment setting 2101 selectively displays a list 2102 of color adjustment settings. The site management application execution module 722 inquires of the data management module 704, obtains color adjustment setting information, and displays it. The list 2102 corresponds to the name 1232 in the obtained color adjustment setting DB 1230. When the color expert selects an arbitrary color adjustment setting in the list 2102, the site management application execution module 722 inquires of the data management module 704, obtains pieces of detailed information of the color adjustment setting, and displays them in an item 2103 and a name 2104. The items and the names displayed here correspond to the name 1232 and the adjustment 1233 saved in the color adjustment setting DB 1230. Buttons 2105 through 2108 are buttons used to edit, delete, create, and save a color adjustment setting, respectively. The same operations as those of the buttons 1505 through 1508 used to perform editing, deletion, creation, and saving in the color verification setting screen shown in FIG. 15 described above are performed for the color adjustment setting DB 1230, and a description thereof will be omitted here.

In the above-described way, the color expert executes the environment setting necessary for performing color management via the screens shown in FIGS. 14 to 21. Note that the UI screens of environment setting described here and setting items and formats displayed in them are merely examples, and another UI screen arrangement in which, for example, the environment setting and result display are included in the same screen may be employed as long as it can achieve the same purpose as described above.

The environment setting information concerning color management, which is instructed by the site management application execution module 722 and saved in the data management module 704, is then transmitted from the printer communication module 703 to the printing apparatus 203. Here, a characteristic control sequence according to the embodiment, in which upon receiving the setting information, the printing apparatus 203 notifies the operator of a necessary operation in the received setting information, will be described below in detail.

A characteristic control sequence according to the embodiment, which is performed when the printing apparatus 203 receives a setting concerning color management, will be described with reference to the flowchart of FIG. 22.

Figure 22:
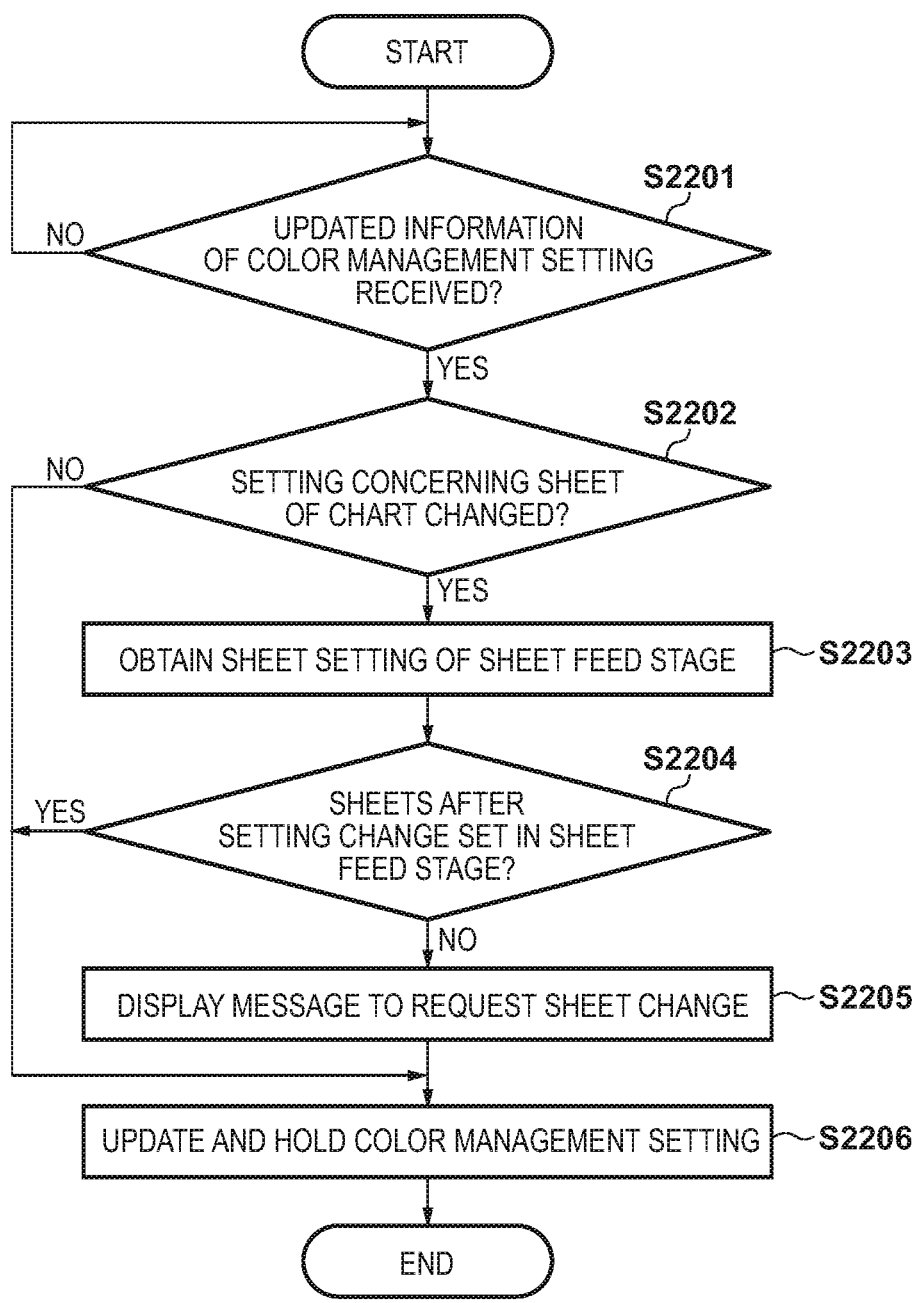
FIG. 22 is a flowchart for describing processing of the printing apparatus according to the embodiment.

FIG. 22 is a flowchart for describing processing of the printing apparatus 203 according to the embodiment. The processing represented by the flowchart is executed by the printer controller 500 in the printing apparatus 203. More specifically, the processing represented by the flowchart is implemented when the CPU 501 deploys a program stored in the HDD 504 into the RAM 503 and executes the deployed program.

First, in step S2201, the CPU 501 determines whether or not the updated information of an environment setting (color management setting) concerning color management is received from the site management server 102. Upon determining that the updated information of a color management setting is received, the process advances to step S2202. In step S2202, the CPU 501 determines whether or not the setting of an item with an influence on an operator operation is updated. Upon determining that the setting of an item with an influence on an operator operation is updated, the process advances to step S2203. Otherwise, the process advances to step S2206. In the embodiment, it is determined whether or not a sheet setting for a chart to be printed when executing color verification processing or executing color adjustment is added or changed as the item with an influence on the operator operation. However, the present invention is not limited to this. For example, it may be determined whether or not the date setting of the execution timing of the color verification operation is changed. In this case, even when many types of sheets are used to obtain a normal product, and an operation of exchanging the sheets to be used for the color verification operation every time immediately before the color verification operation is performed, the operator can notice in advance when the sheets should be exchanged. For this reason, color verification processing that should automatically be executed never stops due to, for example, a paper shortage, and it is therefore possible to efficiently perform the color management operation while keeping the productivity of the entire system.

In step S2203, the CPU 501 obtains, as the current state of the printing apparatus 203, the information of sheets set in a sheet feed stage, and advances the process to step S2204. In step S2204, the CPU 501 compares the color management setting (the sheet setting for the chart) received in step S2201 with the current state (the sheet information in the sheet feed stage) of the printing apparatus obtained in step S2203, and determines whether or not the color management operation can be executed without the operation of the operator. More specifically, the CPU 501 determines whether or not the sheets for chart printing received in step S2201 are set in the sheet feed stage. If the sheets do not exist in the current sheet feed stage, the process advances to step S2205. If the sheets are set in the current sheet feed stage, the process advances to step S2206. In step S2205, the CPU 501 controls to display a warning for the color management operation necessary for automatic execution of color verification on the console unit 512 of the printing apparatus 203. In the embodiment, a sheet change request message as shown in FIG. 23 is displayed, and the process advances to step S2206.

FIG. 23 depicts a view showing an example of a screen displayed on the console unit 512 of the printing apparatus 203 in step S2205 of FIG. 22.

In this screen, since the received sheets for chart printing are not set in the sheet feed stage of the printing apparatus 203, a warning is displayed to supply A3 double-sided coated sheets to the sheet feed stage.

Note that at this time, control may be done such that not only display of a message on the display unit 514 of the console unit 512 but also lighting/blinking of a warning of a tally lamp or the like is performed.

In the embodiment, processing necessary for the color management operation is always displayed. However, the present invention is not limited to this, and whether to display a warning at the time of changing the environment setting of color management may be set for each time. This enables an instruction to not perform excessive display in a case in which the operator reliably knows a setting change, as in a user environment in which the operator also performs the operation of the color expert.

In the embodiment, only the contents of the necessary operation are displayed as a warning for the operator. However, the present invention is not limited to this. Control may be done to highlight only an item with an influence to the operator while displaying all environment settings of color management, as shown in FIG. 24B.

FIGS. 24A and 24B depict views showing an example of another screen displayed on the console unit 512 of the printing apparatus 203 in step S2205 of FIG. 22.

In FIG. 24A, a message representing that the color verification setting necessary for automatic execution of color verification is changed is displayed. If a verification button used to verify the contents of the setting change is pressed here, the screen transitions to the screen shown in FIG. 24B.

In FIG. 24B, the contents of the change in the environment setting of color management are displayed in bold, and it can be known that the type of sheets for color verification is changed to double-sided coated sheets.

With this arrangement, the operator can correctly understand the intention of the color expert, and a more flexible operation is possible. For example, an operation can be decided such that when the number of types of sheets to be used for color management should be kept small, the sheets to be used for a color verification chart are always supplied. On the other hand, the sheets to be used for a color verification chart are not always supplied only in a case of NG at the time of execution of color verification.

Then, the process advances to step S2206, and the CPU 501 saves the environment setting information of color management received in step S2201 in the HDD 504, and ends the processing.

After execution of the flowchart of FIG. 22, the color management module 805 of the printer controller 500 executes color verification processing when the color verification execution condition is satisfied according to the environment setting information. When the color verification processing is executed, the color management module 805 saves measured result information in the data management module 806. In addition, the color management module 805 transmits the measured result information to the site management server 102 and saves it in the data management module 704. The data management module 704 saves the measured result information transmitted from the color management module 805 in 12907 through 12912 in the patch DB 12900.

As described above, according to the embodiment, even in a case in which the color expert changes a setting concerning color management from a remote site, the operator who directly operates the printing apparatus can reliably be notified of only a necessary operation. This allows the operator to quickly notice the operation he/she should perform and reliably execute the color management operation without lowering the productivity of the printing apparatus.

In addition, even in a case in which the color expert wants to frequently change the environment setting concerning color management, the operator can reliably notice the change, and finer color management can be performed. It is therefore possible to provide a printing system capable of performing output of a high quality of color without lowering the productivity of the printing apparatus.

Furthermore, a case in which recovery processing in case of NG in color verification is added as the item with an influence on the operator operation in changing a setting of the color management setting is also included.

Additionally, if sheets that are not used any more in color verification or recovery exist in the sheet feed stage after the change of the color management setting, the sheet feed stage may be highlighted so that the user can easily know where it is.

In the screen showing a sheet setting change for the sheet feed stage, the sheet feed stage may be selected in advance and reversely displayed such that the user can preferentially select the sheet feed stage.

Furthermore, even in a case in which a sheet setting change for the sheet feed stage (a state change on the printing apparatus side) is done after the change of the color management setting, the same verification (verify whether automatic execution of color verification/color adjustment is possible) may be performed, and if automatic execution is impossible, a warning may be displayed.

Additionally, in changing the color management setting, the user may be allowed to select immediate reflection or designation of a date to reflect the setting. If the designation of a date to reflect is selected, a warning may be displayed from the date.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-029052, filed Feb. 21, 2018, which is hereby incorporated by reference herein in its entirety.

What is claimed is:

1. A color management system that includes an external apparatus and a printing apparatus,
    wherein the external apparatus comprises:
    a first controller including a first processor and a first memory, the first controller being configured to:
        send a color verification setting, including at least sheet information, that is set for a color verification operation, and a printed sheet interval indicating an interval of execution of the color verification operation using a number of printed sheets that is set for the color verification operation to the printing apparatus, and
    wherein the printing apparatus comprises:
    a second controller including a second processor and a second memory, the second controller being configured to:
        receive the color verification setting and the printed sheet interval from the external apparatus;
        print a chart image on a sheet corresponding to the sheet information included in the color verification setting in accordance with the received printed sheet interval;
        measure the chart image printed on the sheet; and
        transmit data obtained by a measurement of the chart image to the external apparatus.

2. The color management system according to claim 1, wherein the color verification setting includes a number of patches included in the chart image and colors of the patches.

3. The color management system according to claim 1, wherein the color verification setting includes an identification information of a reference and a number of patches corresponding to the reference.

4. A printing apparatus capable of connecting to an external apparatus, the printing apparatus comprising:
a controller including a processor and a memory, the controller being configured to:
receive a color verification setting and a printed sheet interval indicating an interval of execution of the color verification operation using a number of printed sheets from the external apparatus;
print a chart image on a sheet corresponding to sheet information included in the color verification setting in accordance with the received printed sheet interval;
measure the chart image printed on the sheet; and
transmit data obtained by a measurement of the chart image to the external apparatus.

5. The printing apparatus according to claim 4, wherein the color verification setting includes a number of patches included in the chart image and colors of the patches.

6. The printing apparatus according to claim 4, wherein the color verification setting includes an identification information of a reference and a number of patches corresponding to the reference.

7. The printing apparatus according to claim 4, wherein the controller is further configured to perform a color adjustment operation based on a result obtained by analyzing the transmitted data with the external apparatus in accordance with a color adjustment request received from the external apparatus.

8. The printing apparatus according to claim 4, wherein the controller is further configured to:
store the received printed sheet interval in a storage; and
update the color verification setting stored in the storage upon receiving update information of the color verification setting.

9. A method of controlling a printing apparatus capable of connecting to an external apparatus, the method comprising:
receiving a color verification setting and a printed sheet interval indicating an interval of execution of the color verification operation using a number of printed sheets from the external apparatus;
printing a chart image on a sheet corresponding to sheet information included in the color verification setting in accordance with the received printed sheet interval;
measuring the chart image printed on the sheet; and
transmitting data obtained in the measuring of the chart image to the external apparatus.

10. The printing apparatus according to claim 8, wherein the update information includes information for updating sheet information,
wherein the controller is further configured to:
determine whether or not a sheet corresponding to the updated sheet information exists in a sheet feeder; and
in a case that it is determined the sheet corresponding to the updated sheet information does not exist in the sheet feeder, display, on a display, a message for prompting a user to replenish the sheet on the sheet feeder.

11. A method of controlling a color management system that includes an external apparatus and a printing apparatus, the method comprising:
sending, for the external apparatus, a color verification setting, including at least sheet information, that is set for a color verification operation and a printed sheet interval indicating an interval of execution of the color verification operation using a number of printed sheets that is set for the color verification operation to the printing apparatus;
receiving, for the printing apparatus, the color verification setting and the printed sheet interval from the external apparatus;
printing, for the printing apparatus, a chart image on a sheet corresponding to the sheet information included in the color verification setting in accordance with the received printed sheet interval;
measuring, for the printing apparatus, the chart image printed on the sheet; and
transmitting, for the printing apparatus, data obtained by a measurement of the chart image to the external apparatus.

* * * * *